US011985641B2

(12) United States Patent
Das et al.

(10) Patent No.: US 11,985,641 B2
(45) Date of Patent: May 14, 2024

(54) NODE APPARATUS AND METHODS FOR PROVIDING HIGH-CAPACITY DATA SERVICES VIA A CONTENT DELIVERY NETWORK ARCHITECTURE

(71) Applicant: Charter Communications Operating, LLC, St. Louis, MO (US)

(72) Inventors: Pratik Das, Centennial, CO (US); Diwelawatte Jayawardene, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/855,747

(22) Filed: Apr. 22, 2020

(65) Prior Publication Data
US 2021/0337543 A1 Oct. 28, 2021

(51) Int. Cl.
*H04W 72/04* (2023.01)
*H04B 10/2575* (2013.01)
(Continued)

(52) U.S. Cl.
CPC .. *H04W 72/0453* (2013.01); *H04B 10/25753* (2013.01); *H04N 21/2143* (2013.01); *H04N 21/6131* (2013.01); *H04W 16/14* (2013.01)

(58) Field of Classification Search
CPC .............. H04W 72/0453; H04W 16/14; H04B 10/25753; H04N 21/2143; H04N 21/6131
See application file for complete search history.

(56) References Cited

U.S. PATENT DOCUMENTS 5,742,583 A 4/1998 Scott
6,542,730 B1 4/2003 Hosain
(Continued)

FOREIGN PATENT DOCUMENTS

JP 2006325206 A 11/2006
JP 2007281617 A 10/2007
(Continued)

OTHER PUBLICATIONS

Deering, S., et al., "Internet Protocol, Version 6 (IPv6) Specification", Internet Engineering Task Force (IETF), Dec. 1998, 39 pages.
(Continued)

*Primary Examiner* — Khawar Iqbal
(74) *Attorney, Agent, or Firm* — Patent Beach PC

(57) ABSTRACT

Node apparatus and methods for providing high-bandwidth, low-latency data service over a content delivery network including existing wireline infrastructure. In one embodiment, a network architecture having service delivery over at least portions of extant hybrid fiber coax (HFC) infrastructure is disclosed, which includes a node that enables standards-compliant ultra-low latency and high data rate services (e.g., 3GPP and IEEE Std. 802.11 services). In one variant, an expanded frequency band (e.g., 1.6 GHz in total bandwidth) is used over the coaxial portions of the HFC infrastructure, which is allocated to two or more sub-bands via 802.11ax protocols. The node is used in various network architectures configured to support different use cases such as for providing a small cell service, a distributed antenna system (DAS) at an enterprise premises or a venue, and a redundancy capability of data communication.

25 Claims, 25 Drawing Sheets

(51) Int. Cl.
*H04N 21/214* (2011.01)
*H04N 21/61* (2011.01)
*H04W 16/14* (2009.01)
*H04W 72/0453* (2023.01)

(56) References Cited

U.S. PATENT DOCUMENTS

| | | | |
|---|---|---|---|
| 6,542,739 | B1 | 4/2003 | Garner |
| 7,581,012 | B2 | 8/2009 | Shiouchi et al. |
| 7,606,529 | B1 | 10/2009 | Swan et al. |
| 8,599,797 | B2 | 12/2013 | Pelkonen |
| 8,724,588 | B2 | 5/2014 | Li et al. |
| 8,750,710 | B1 | 6/2014 | Hirt et al. |
| 8,880,071 | B2 | 11/2014 | Taaghol et al. |
| 9,209,898 | B1 | 12/2015 | Schemmann et al. |
| 9,596,593 | B2 | 3/2017 | Li et al. |
| 9,706,512 | B2 | 7/2017 | Suh |
| 10,009,431 | B2 | 6/2018 | Holtmanns |
| 10,375,629 | B2 | 8/2019 | Zhang |
| 10,506,499 | B2 | 12/2019 | Keller et al. |
| 10,693,687 | B1 | 6/2020 | Kushnir |
| 10,735,095 | B1* | 8/2020 | Kim ............... H04B 10/25752 |
| 10,742,270 | B1* | 8/2020 | Kim ............... H04B 7/0456 |
| 10,924,825 | B2 | 2/2021 | Das et al. |
| 11,044,597 | B2 | 6/2021 | Wong et al. |
| 11,553,244 | B2* | 1/2023 | Maricevic ........... H04L 12/2801 |
| 11,563,491 | B2* | 1/2023 | Bowler ............... H04B 7/01 |
| 2004/0158649 | A1 | 8/2004 | Ophir et al. |
| 2004/0187156 | A1 | 9/2004 | Palm et al. |
| 2005/0034159 | A1 | 2/2005 | Ophir et al. |
| 2005/0063317 | A1 | 3/2005 | Risberg et al. |
| 2006/0262770 | A1 | 11/2006 | Park et al. |
| 2008/0101291 | A1 | 5/2008 | Jiang et al. |
| 2008/0279287 | A1 | 11/2008 | Asahina |
| 2009/0110088 | A1 | 4/2009 | Di Giandomenico et al. |
| 2009/0119735 | A1 | 5/2009 | Dounaevski et al. |
| 2010/0064330 | A1 | 3/2010 | Yu et al. |
| 2012/0076009 | A1 | 3/2012 | Pasko |
| 2012/0083207 | A1 | 4/2012 | Rofougaran et al. |
| 2012/0224563 | A1 | 9/2012 | Zisimopoulos et al. |
| 2012/0246255 | A1 | 9/2012 | Walker et al. |
| 2013/0010686 | A1 | 1/2013 | Shatzkamer |
| 2013/0077554 | A1 | 3/2013 | Gauvreau |
| 2013/0156115 | A1 | 6/2013 | Petrovic |
| 2013/0178225 | A1 | 7/2013 | Xing |
| 2013/0267229 | A1 | 10/2013 | Gopalakrishnan |
| 2013/0279914 | A1 | 10/2013 | Brooks |
| 2013/0322504 | A1 | 12/2013 | Asati et al. |
| 2014/0148107 | A1 | 5/2014 | Maltsev et al. |
| 2014/0269865 | A1 | 9/2014 | Aparin |
| 2015/0156777 | A1 | 6/2015 | Negus et al. |
| 2015/0181363 | A1 | 6/2015 | Khorami |
| 2015/0201088 | A1 | 7/2015 | Wu et al. |
| 2015/0229584 | A1 | 8/2015 | Okamoto et al. |
| 2016/0013855 | A1 | 1/2016 | Campos et al. |
| 2016/0020835 | A1 | 1/2016 | Stadelmeier et al. |
| 2016/0021595 | A1 | 1/2016 | Czaja et al. |
| 2016/0073344 | A1 | 3/2016 | Vutukuri et al. |
| 2016/0094421 | A1 | 3/2016 | Bali et al. |
| 2016/0127434 | A1 | 5/2016 | Yoon et al. |
| 2016/0128072 | A1 | 5/2016 | Rajagopal et al. |
| 2016/0259923 | A1 | 9/2016 | Papa et al. |
| 2016/0294498 | A1 | 10/2016 | Ma et al. |
| 2017/0118527 | A1 | 4/2017 | Wachob et al. |
| 2017/0164068 | A1 | 6/2017 | Wachob et al. |
| 2017/0208488 | A1 | 7/2017 | Hwang et al. |
| 2017/0214448 | A1* | 7/2017 | Lipowski ............... H04W 24/04 |
| 2017/0245281 | A1 | 8/2017 | Zuckerman et al. |
| 2017/0265220 | A1 | 9/2017 | Andreoli-Fang et al. |
| 2018/0063813 | A1 | 3/2018 | Gupta et al. |
| 2018/0092142 | A1 | 3/2018 | Han et al. |
| 2018/0146408 | A1 | 5/2018 | Meylan et al. |
| 2018/0167128 | A1 | 6/2018 | Kinamon et al. |
| 2018/0184337 | A1 | 6/2018 | Jin et al. |
| 2018/0213452 | A1 | 7/2018 | Kim et al. |
| 2018/0242327 | A1 | 8/2018 | Frenne et al. |
| 2018/0269974 | A1 | 9/2018 | Luciano |
| 2018/0331935 | A1 | 11/2018 | Ross et al. |
| 2018/0343685 | A1 | 11/2018 | Hart et al. |
| 2018/0351809 | A1 | 12/2018 | Meredith et al. |
| 2019/0028141 | A1 | 1/2019 | Padden et al. |
| 2019/0347630 | A1 | 1/2019 | Zhang |
| 2019/0082501 | A1 | 3/2019 | Vesely et al. |
| 2019/0109643 | A1 | 4/2019 | Campos et al. |
| 2019/0124572 | A1 | 4/2019 | Park et al. |
| 2019/0124696 | A1 | 4/2019 | Islam et al. |
| 2019/0208380 | A1 | 7/2019 | Shi et al. |
| 2019/0229974 | A1 | 7/2019 | Campos et al. |
| 2019/0253944 | A1 | 8/2019 | Kim |
| 2019/0261264 | A1 | 8/2019 | Lou et al. |
| 2019/0289470 | A1 | 9/2019 | Vaidya et al. |
| 2019/0319814 | A1 | 10/2019 | Das |
| 2019/0319858 | A1 | 10/2019 | Das et al. |
| 2019/0320250 | A1 | 10/2019 | Hoole et al. |
| 2019/0320322 | A1 | 10/2019 | Jayawardene et al. |
| 2019/0320494 | A1 | 10/2019 | Jayawardene et al. |
| 2019/0320498 | A1 | 10/2019 | Sadri et al. |
| 2019/0334599 | A1 | 10/2019 | Davydov |
| 2019/0349848 | A1 | 11/2019 | Bali |
| 2019/0357037 | A1 | 11/2019 | Velev et al. |
| 2019/0357199 | A1 | 11/2019 | Ali et al. |
| 2019/0379443 | A1* | 12/2019 | Pyun ............... H04B 10/25754 |
| 2019/0379455 | A1 | 12/2019 | Wang et al. |
| 2020/0091608 | A1 | 3/2020 | Alpman et al. |
| 2020/0112888 | A1 | 4/2020 | Glennon et al. |
| 2020/0119877 | A1 | 4/2020 | Wang et al. |
| 2020/0154388 | A1 | 5/2020 | Koshimizu et al. |
| 2020/0214065 | A1 | 7/2020 | Tomala et al. |
| 2020/0280836 | A1 | 9/2020 | Velev et al. |
| 2021/0028915 | A1* | 1/2021 | Jia ..................... H04N 21/6118 |
| 2021/0029759 | A1 | 1/2021 | Tang |
| 2021/0050906 | A1* | 2/2021 | Campos ............ H04B 7/12 |
| 2021/0112551 | A1 | 4/2021 | Anderson et al. |
| 2021/0175925 | A1* | 6/2021 | Tarighat Mehrabani ..................... H04B 3/36 |
| 2021/0176665 | A1 | 6/2021 | Lan et al. |
| 2021/0250196 | A1* | 8/2021 | Das ................ H04L 12/2801 |
| 2021/0378039 | A1 | 12/2021 | Cherian et al. |
| 2021/0409979 | A1 | 12/2021 | Wang et al. |
| 2022/0039180 | A1 | 2/2022 | Mukherjee et al. |
| 2022/0045422 | A1* | 2/2022 | Lipowski ............ H04B 7/0408 |
| 2022/0078624 | A1 | 3/2022 | Hong |
| 2022/0132524 | A1 | 4/2022 | Mueck et al. |
| 2023/0037887 | A1* | 2/2023 | Wachob ............... H04N 21/647 |
| 2023/0044867 | A1* | 2/2023 | Wolcott ............... H04W 24/08 |

FOREIGN PATENT DOCUMENTS

| | | |
|---|---|---|
| JP | 2009135880 A | 6/2009 |
| JP | 2010136020 A | 6/2010 |
| JP | 2016511998 A | 4/2016 |
| JP | 2018023050 A | 2/2018 |
| JP | 2018510589 A | 4/2018 |
| KR | 20160097917 A | 8/2016 |
| WO | WO-2004045125 A2 | 5/2004 |
| WO | WO-2015111767 A1 | 7/2015 |
| WO | WO-2015147707 A1 | 10/2015 |
| WO | WO-2018131488 A1 | 7/2018 |
| WO | WO-2020197452 A1 | 10/2020 |
| WO | WO-2020232461 A2 | 11/2020 |
| WO | WO-2021220624 A1 | 11/2021 |

OTHER PUBLICATIONS

IEEE Std. 802.11, 1997.
"P802.11ax—IEEE Standard for Information technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN" Dec. 6, 2017.
Signaling Protocols and Procedures for Citizens Broadband Radio Service (CBRS): Spectrum Access System, (SAS)—Citizens Broad-

(56) References Cited

OTHER PUBLICATIONS band Radio Service Device (CBSD) Interface Technical Specification—Document WINNF-TS-0016, Version V1.2.1.3, Jan. 3, 2018, 60 pages.
Wi-Fi Direct (including "Wi-Fi Peer-to-Peer (P2P) Specification"), copyright 2014, Wi-Fi Alliance.
"Internet Protocol, DARPA Internet Program, Protocol Specification", IETF RCF 791, Sep. 1981, 50 pages.
FCC Consumer Guideline regarding signal leakage, printed Jan. 29, 2021 from https://www.fcc.gov/consumers/guides/cable-signal-leakage.
Aoyama et al., "Video System Optical Receiving Terminal Device", Jun. 18, 2009, JP, English translation of JP-2009135880.

\* cited by examiner

NODE APPARATUS AND METHODS FOR PROVIDING HIGH-CAPACITY DATA SERVICES VIA A CONTENT DELIVERY NETWORK ARCHITECTURE

RELATED APPLICATIONS

This application is generally related to the subject matter of co-owned U.S. Provisional Patent Application Ser. No. 62/658,465 filed Apr. 16, 2018 and entitled "APPARATUS AND METHODS FOR INTEGRATED HIGH-CAPACITY DATA AND WIRELESS NETWORK SERVICES", which is now published as U.S. Patent Application Publication No. 2019/0320322 of the same title filed Dec. 11, 2018, each of which is incorporated herein by reference in its entirety.

This application is also generally related to the subject matter of co-pending U.S. patent application Ser. No. 16/261,234 filed Jan. 29, 2019 and entitled "APPARATUS AND METHODS FOR ENABLING MOBILITY OF A USER DEVICE IN AN ENHANCED WIRELESS NETWORK," U.S. patent application Ser. No. 16/384,706 filed Apr. 15, 2019 and entitled "APPARATUS AND METHODS FOR COORDINATED DELIVERY OF MULTIPLE DATA CHANNELS OVER PHYSICAL MEDIUM," U.S. patent application Ser. No. 16/384,561 filed Apr. 15, 2019 and entitled "APPARATUS AND METHODS FOR INTEGRATED HIGH-CAPACITY DATA AND WIRELESS IOT (INTERNET OF THINGS) SERVICES," U.S. patent application Ser. No. 16/384,805 filed Apr. 15, 2019 and entitled "GATEWAY APPARATUS AND METHODS FOR WIRELESS IOT (INTERNET OF THINGS) SERVICES," U.S. patent application Ser. No. 16/384,701 filed Apr. 15, 2019 and entitled "APPARATUS AND METHODS FOR ENHANCING QUALITY OF EXPERIENCE FOR OVER-THE-TOP DATA SERVICES OVER HIGH-CAPACITY WIRELESS NETWORKS," U.S. patent application Ser. No. 16/788,138 filed Feb. 11, 2020 and entitled "APPARATUS AND METHODS FOR PROVIDING HIGH-CAPACITY DATA SERVICES OVER A CONTENT DELIVERY NETWORK," and U.S. patent application Ser. No. 16/855,913 filed contemporaneously herewith on Apr. 22, 2020 and entitled "PREMISES APPARATUS AND METHODS FOR AGGREGATED HIGH-CAPACITY DATA SERVICES," each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networks and wireless devices, and specifically in one exemplary aspect to an architecture which provides high-speed data service to user premises via a content delivery network using, inter alia, wireless technology.

2. Description of Related Technology

Data communication services are now ubiquitous throughout user premises (e.g., home, office, vehicles, and even larger venues such as e.g., sports arenas, conference or convention centers, hotels, concert halls, airports, etc.). Such data communication services may be provided via a managed or unmanaged network. For instance, a typical home has services provided by one or more network service providers via a managed network such as a cable or satellite network. These services may include content delivery (e.g., linear television, on-demand content, personal or cloud DVR, "start over", etc.), as well as so-called "over the top" delivery of third-party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere, anytime", so that users (subscribers) can access the desired services (e.g., watching a movie) via a number of different receiving and rendering platforms, such as in different rooms of their houses, on their mobile devices while traveling, etc.

Issues with Existing Architecture and Services

As user appetite for enhanced data rates, mobility and diversity of services has increased over time, service providers have sought new technologies and paradigms for service delivery to compensate. In the case of cable networks, only so much expansion or enhancement is possible under traditional technology models (e.g., use of 800 MHz of spectral bandwidth with limited upstream bandwidth, modulation schemes, DOCSIS protocols, etc.), and even where such enhancement is possible, significant capital and R&D (research and development) expenditures are required to upgrade or adapt these existing technologies and infrastructure to the new required levels of performance.

As a simple example of the foregoing, consider a multi-dwelling unit (MDU) served by an existing hybrid fiber coax (HFC) network topology (see discussion of FIGS. 1 and 2 below). The network will typically utilize optical fiber to deliver data to a network node, which then converts the optical domain data to RF (radio frequency) signals for transmission over the existing coaxial cable distribution network and to the served customers at the edge of the network (including the aforementioned MDU, which as most legacy structures, is internally wired with coaxial cable serving each individual dwelling unit therein, with the owner of the MDU retaining ownership of the cable installed by the multiple systems operator (MSO) and hence representing a "sunk cost" investment to the MSO). As customers demand increased levels of service (high data rates, more features, etc.) in order to maintain their loyalty/subscription in the face of competing services such as cellular data, fiber, satellite, etc., the cable MSO is often faced with the daunting prospect of upgrading the infrastructure serving such MDUs, which may include addition of fixed wireless access (FWA) infrastructure, replacing of miles of coaxial cable with optical fiber, and similar.

For instance, to achieve certain capacity targets (e.g., 10 Gbps) over such infrastructure, increased use of optical fiber is needed in certain parts of the infrastructure. Under current HFC network design, services are provided to users via a coaxial cable "drop" to their premises, and groups of such premises are served by common tap-off points or nodes within the larger architecture (see discussion of cable systems supra). Individual premises "tap off" the cabling or other infrastructure from each node and, depending on their geographic placement and other considerations, may require utilization of a number of different amplification units in order to maintain sufficient signal strength out to the most distant (topology-wise) premises in the system. For instance, a common description of how many amplifier stages are used between a source node and premises is "N+i", where i=the number of amplifier stages between the source node and the premises. For instance, N=0 refers to the situation where no amplifiers are used, and N+3 refers to use of three (3) amplifiers. In some extant cable/HFC systems in operation, values of i may be as high as seven (7); i.e., N+7, such as for service to rural areas.

As can be expected, use of such amplifier stages introduces some limitations on the data rates or bandwidth (both downstream—i.e., toward the client premises; and upstream—i.e., from the client premises) achievable by such systems. In effect, such systems are limited in maximum bandwidth/data rate, due in part to the design of the amplifiers; for example, they are typically designed to provide services primarily in the downstream direction (with much lower upstream bandwidth via so-called "OOB" or out-of-band RF channels providing highly limited upstream communication).

Cable modem or DOCSIS-compliant systems utilize DOCSIS QAMs (RF channels) for enhanced upstream bandwidth capability such as for Internet services, but even such technologies are in their current incarnations significantly limited in capability, and moreover have limited flexibility in the allocation of downstream versus upstream bandwidth, especially dynamically. For example, based on the DOCSIS protocols utilized for e.g., a coaxial infrastructure available in the aforementioned MDU served within a managed HFC network, throughput availability for downstream and upstream is in effect "hard-wired" based on how much of an available amount of spectrum is reserved for each direction. Because of this hard-wired availability, as well as the use of the aforementioned taps and amplifier stages, upstream throughput is limited in the foregoing HFC network.

As alluded to above, one way of achieving higher data rates may require replacement of such amplifier stages (and supporting coaxial cabling) with other mediums such as optical fiber (sometimes referred to as going "fiber deep", which can provide for example higher bandwidth, lower loss, and symmetric operation), microwave dishes at rooftop, and Ethernet cable (which can also provide symmetric operation), including going all the way back to an N+0 configuration throughout the entire network. However, replacement of literally tens of thousands of amplifiers and thousands of miles of cabling with optical fiber or the like is prohibitively expensive, and can take years.

Higher data rates may be achieved by implementation of DOCSIS 4.0 protocols; this version of the DOCSIS standard supports e.g., two (2) modes of use: (i) extended spectrum, without full duplex (which means separate allocation of downstream and upstream bandwidth, which can result in loss of capacity since the downstream and upstream bandwidth needs may not necessarily be static); and (ii) full duplex. Full duplex or symmetric DOCSIS 4.0, while providing significant enhancement over existing asymmetric DOCSIS systems, similarly requires significant capital investment and technology development, including relating to its supporting ecosystem (which in fact is one salient reason why the 4.0 standard also includes the first (i) mode described above, which in effect amounts to a legacy mode). The high implementation cost (including a long lead time) of continuous research and development for the newer developments in DOCSIS is moreover likely to persist, in part due to fragmented MSO selection of one of the aforementioned modes over the other.

Hence, replacing large portions of coaxial cable infrastructure with optical fiber, retrofitting to utilize the latest DOCSIS 4.0 technology, adding FWA for high-speed wireless backhaul, or other such upgrades to the existing MSO infrastructure represent (i) a huge CAPEX cost for the MSO (especially in dense urban environments with literally hundreds of closely spaced MDUs), and (ii) in some cases significant amounts of R&D for development of the necessary supporting ecosystem; these expenditures and development-induced latencies ideally would be at least partly avoided if somehow the extant HFC infrastructure could be enhanced or "repurposed" to include higher data rates, more symmetry between US and DS capability, and expanded types of services (such as mobility services).

Another issue to be addressed is the presence of delivered versus actual capacity "mismatch" with current systems. Even with delivery systems that currently provide a high degree of capability and symmetry (such as optical fiber), extant technologies for utilizing this delivered capacity symmetrically, and to its full capacity, are only now under development and not yet deployed. As such, even with a high US and DS capability available with e.g., optical fiber service, the end-user equipment such as 802.11ac routers can only utilize portions of this capability (and not nearly to its full capacity). Similarly, when considering a coaxial cable, it in theory can provide much higher data rates, and symmetrically, than current delivery paradigms such as DOCSIS 3.1 used by cable modems, and in-band 6 MHz channels (DS) used by DTSBs can provide. Hence, stated simply, the large existing inventory of coaxial cable is physically capable of much better performance than current protocols and end-user components can support.

As a brief aside, typical wireless access nodes such as Wi-Fi APs have an effective connectivity range on the order of one hundred (100) feet, depending on factors such as the presence or absence of buildings or other structures (and their materials of construction), and other interfering emitters. The optimal location of the wireless interface (e.g., an access point (AP), wireless access point (WAP), router, etc.) is sometimes a three-dimensional spatial problem, as client devices that will communicate with the wireless interface may be located on the same floor of a building or structure (in any azimuth direction), and also on different floors above and below the wireless interface's position. In addition, at any of the locations where a client device is located, other local factors affecting the device's ability to communicate with the wireless interface may also exist, such as radio frequency (RF) signal path loss/attenuation (such as due to interposed materials, instruments, etc.), ionosphere signal reflections and refractions (e.g., atmospheric ducting), and fading (which degrades the radio signals due to rapid fluctuations of the amplitudes, phases, or multipath delays of a radio signal over a short period or short travel distance due to interfering environment). Moreover, interference from other RF or electromagnetic sources such as other wireless-enabled devices in the same frequency band, non-communication interference sources (e.g., microwave ovens), solar radiation, and so forth can further attenuate or disrupt WLAN and similar signals.

Additionally, the characteristics of a wireless interface such as an AP (as well as the corresponding client devices) are such that they may have directional RF properties due to, e.g., variances in antenna gain in different directions, obstruction by internal components of the device, etc.

In the exemplary context of a concert venue (e.g., music hall or the like), the construction of the venue including the stage, electrical or electronic musical instruments or equipment on the stage or proximate thereto, and other RF or electromagnetic sources in the audience or on stage have an effect on the spatial distribution of RF signals around the stage (and the venue generally). For example, the construction of the stage involves the use of different materials such as concrete, brick, dry-wall, wood, glass, metal framing, etc., that each may have different attenuation properties at exemplary radio frequencies used in wireless systems (e.g., 2.4 GHz, 3.6 GHz and 5 GHz). Also, signals at these frequencies create multi-path propagation throughout the venue, especially with other factors of interference and at increasing distances from the wireless interface, and can be quite unpredictable. Thus, all the locations within the venue (including those where user wireless devices may be used) are individually different in terms of the propagation path to and from the wireless interface, and hence signal strength at that location.

Additionally, even when the placement of wireless interface(s) such as WLAN APs within a venue is optimized for the particular attributes of that venue (e.g., based on construction materials of the building, particular shapes and placement of the building components, etc.), the connectivity and multi-path propagation throughout the venue will be affected by the interfering emitters that are introduced during the performance or event (e.g., by the introduction of an audience or other participants with their own potentially interfering devices), and/or during the pre-staging phase of the performance/event (e.g., instrument set-up, sound checks, etc.). Even at open-seating type events such as auto or trade shows, any modeling or planning the venue operator might perform prior to the event itself may be somewhat obsolete at the time of the event, due to the introduction of vehicles, personal electronic devices, demonstration devices, etc., and in some cases variation of the presence, location, and/or operation of these items over the course of the event duration. Moreover, the characteristics of a given venue may significantly change as a function of the type of event hosted in the venue. As alluded to above, equipment and material placement within the venue may significantly alter the RF propagation characteristics for various frequency bands, such that during one type of event (e.g., a trade show with no assigned seating and comparatively static displays) the RF performance in the desired bands is sufficient at a given location, whereas that same location may have unacceptable performance under during another type of event (e.g., concert with removable seating, stage, etc. added inside the venue, and a higher per-areas user density (and hence user personal wireless device density).

Based on the foregoing, service providers including the cable MSOs, are faced with the challenge of figuring out how to effectively and efficiently serve user devices disposed at various types of venues, including larger venues as those mentioned above, without incurring high additional cost.

Accordingly, improved node apparatus and methods of placement and operation thereof are needed to, inter alia, enable optimized delivery of ultra-high data rate services (both wired and wireless) symmetrically, and which leverage extant network infrastructure such as the large inventory of installed coaxial cable and supporting infrastructure in both MSO networks and the premises they serve. Ideally, such improved node apparatus and methods would also enable various network architectures that can be utilized to provide high-capacity data services to a plurality of user premises and venues under varying different configurations.

SUMMARY

The present disclosure addresses the foregoing needs by providing, inter alia, node apparatus and methods for delivering ultra-high data rate services (both wired and wireless) by leveraging extant network infrastructure via e.g., new wireless technology capabilities.

In a first aspect of the disclosure, a node apparatus is described. In one embodiment, the node apparatus includes: a first port for interfacing with a first portion of a network topology using at least a first type of network medium for data transmission; a second port for interfacing with a second portion of the network topology using at least a second type of network medium for data transmission; first network interface logic in communication with the first port; first RF integrated circuit (IC) apparatus in data communication with the first network interface logic, the at least one RF integrated circuit configured to at least generate RF waveforms within a first prescribed frequency band; frequency shifter apparatus configured to shift the RF waveforms within the prescribed frequency band to a frequency lower than the prescribed frequency band; and second RF IC apparatus in data communication with the first network interface logic, the second IC apparatus configured to at least generate RF waveforms within a second prescribed frequency band.

In one variant, the first portion of the network topology includes a fiber-optic distribution portion of the network topology, and the second portion includes a coaxial cable portion of the network topology, such as e.g., a hybrid fiber coaxial (HFC) cable television network topology operated by a multiple systems operator (MSO).

In another variant, the first RF integrated circuit apparatus includes at least one IEEE-Std. 802.11ax compliant IC or chipset configured to generate at least part of the RF waveforms within a first sub-band of the first prescribed frequency band. In one implementation thereof, the first RF integrated circuit apparatus further includes a second IC or chipset configured to generate at least part of the RF waveforms within a second sub-band of the first prescribed frequency band, the first and second sub-bands being non-overlapping in frequency. For instance, in one configuration, the first and second sub-bands each comprise frequency band below 1.6 GHz, said frequency bands below 1.6 GHz suitable for transmission over a coaxial cable portion of the network topology, the coaxial cable portion including the second portion of the network topology.

In another implementation, the first IC or chipset is configured to generate the at least part of the RF waveforms within the first sub-band for output via four (4) first ports or spatial diversity channels, and the second IC or chipset is configured to generate the at least part of the RF waveforms within the second sub-band for output via four (4) second ports or spatial diversity channels.

In a further variant of the node apparatus, the second RF IC apparatus includes an IC or chipset configured to support at least one of 3GPP Long Term Evolution (LTE) or 3GPP 5G NR (New Radio) protocols. The generated RF waveforms within the second prescribed frequency band comprise e.g., an unlicensed or quasi-licensed spectrum band selected from the group consisting of: (i) NR-U bands, (ii) CBRS bands, and (iii) C-Bands.

In another implementation, the RF waveforms within the second prescribed frequency band are coupled to the second port via a signal path including at least a second frequency shifter apparatus and amplification logic; and the second frequency shifter apparatus is configured to shift the RF waveforms within the cellular band to a third sub-band within the first prescribed frequency band.

In another aspect, a simplified or reduced-complexity node apparatus is disclosed. In one embodiment the simplified apparatus includes a single 802.11ax chipset and a single 4G/5G cellular chipset, each coupled to respective DS/US frequency shifter apparatus. In one variant, only the 802.11ax chipset can produce both local (WLAN) waveforms and waveforms for transmission on the coaxial cable (as well as reception of each); the cellular chipset is configured solely for transmission/reception on the cable medium.

In another aspect of the disclosure, a method of providing a small cell wireless service via coaxial cable infrastructure is described. In one embodiment, the method includes: receiving one or more radio frequency (RF) signals at a network node in data communication with the coaxial cable infrastructure, the one or more radio frequency (RF) signals received via the coaxial cable infrastructure; converting the received one or more RF signals to one or more electrical domain signals; converting the one or more electrical domain signals into one or more cellular RF domain signals via a cellular chipset apparatus of the network node; and transmitting the one or more cellular RF domain signals to a user apparatus within a wireless range of the network node via one or more antenna apparatus of the network node.

In one variant of the method, the receiving the one or more radio frequency (RF) signals via the coaxial cable infrastructure includes receiving the one or more RF signals transmitted from a premises apparatus within a prescribed frequency band, the one or more RF signals having been down-converted to the prescribed frequency band from a cellular frequency band prior to said transmitting.

In another variant, the converting the received one or more RF signals to one or more electrical domain signals includes converting the received one or more RF signals to baseband data via a second chipset apparatus of the network node.

In a further variant, the receiving one or more radio frequency (RF) signals via the coaxial cable infrastructure includes receiving the one or more RF signals as IEEE Std. 802.11ax-compliant waveforms; and the converting the received one or more RF signals via a second chipset apparatus of the network node includes utilizing an IEEE Std. 802.11ax-compliant chipset to convert the IEEE Std. 802.11ax-compliant waveforms to baseband data. The method further includes in one implementation processing the baseband data utilizing at least a MAC (media access controller) process of the network node as part of providing said baseband data to said cellular chipset apparatus In another aspect of the disclosure, a method of providing redundancy in data communication via a coaxial cable infrastructure is disclosed. In one embodiment, the method includes: transmitting first signals via a first cable radio frequency (RF) band over a first cable path of the coaxial cable infrastructure; transmitting second signals via a second cable RF band over a second cable path of the coaxial cable infrastructure; processing at least one of the transmitted first and the second signals at a common node; and transmitting the processed signals to premises equipment associated with the common node.

In one variant of the method, the transmitting first signals via the first cable radio frequency (RF) band over the first cable path of the coaxial cable infrastructure includes transmitting the first signals in a first radio frequency (RF) band that can be supported by the first cable path; the transmitting second signals via the second cable radio frequency (RF) band over the second cable path of the coaxial cable infrastructure includes transmitting the second signals in a second radio frequency (RF) band that can be supported by the second cable path, the second band not overlapping the first band in frequency; and the processing at least one of the transmitted first and second signals at a common node includes combining the first and second signals at the common node. In one implementation thereof, the transmitting the processed signals to premises equipment associated with the common node includes transmitting the combined first and second signals to an RF premises apparatus via a coaxial cable.

In another variant, the method further includes distributing the combined first and second signals via at least the premises equipment to a plurality of users of the premises, the plurality of users having a number greater than a number of users supportable via use of either the first or second cable path alone.

In yet another variant, the transmitting first signals via the first cable radio frequency (RF) band over the first cable path of the coaxial cable infrastructure includes transmitting the first signals in a first radio frequency (RF) band that can be supported by the first cable path; the transmitting second signals via the second cable radio frequency (RF) band over the second cable path of the coaxial cable infrastructure includes transmitting the second signals in the first radio frequency (RF) band, the second signals only transmitted during an absence of the first signals; and the processing at least one of the transmitted first and second signals at a common node includes selecting an available one or the other of the first and second signals at the common node. In one implementation thereof, the transmitting the processed signals to premises equipment associated with the common node includes transmitting the selected first or second signals to an RF premises apparatus via a coaxial cable.

In another implementation, the method further includes detecting a failure of a first distribution node in signal communication with and which supports the first cable path; and based at least on the detecting, cause said transmitting of the second signals.

In another aspect, a frequency plan for use on a hybrid fiber/optical network is disclosed. In one embodiment, the frequency plan includes a total available spectrum of greater than 1 GHz (e.g., approximately 1.6 GHz in total), with high-speed symmetric US and DS capability, as well as utilization of portions of the available spectrum for cellular (e.g., 3GPP 4G or 5G) service, and for ISM-band (e.g., 900 MHz) communications. In one variant, the extant capability of IEEE Std. 802.11ax devices (e.g., chipsets) for 160 MHz channel bandwidth is used to generate two approximately 640 MHZ-wide sub-bands each with four (4) 160 MHz channels which can be independent allocated to different users, and to different delivery directions (i.e., US or DS).

In one variant, the plan includes frequency assets that are allocated to or divided up among two or more discrete node apparatus. For example, in one implementation, two node apparatus are used, each with cellular, high-speed symmetric US/DS, and ISM band capability. In one configuration, all but the ISM band capability is non-overlapping between the two nodes.

In another aspect, apparatus and methods for converting optical input to coaxial output are disclosed.

In a further aspect, apparatus and methods for delivering mobility service through an extant network infrastructure without interfering with broadband data service are disclosed.

In yet an additional aspect, apparatus and methods for utilization of technology adapted for a first wireless paradigm to a wired paradigm (e.g., WLAN 802.11ax technology onto an extant HFC network infrastructure) are disclosed.

In another aspect, apparatus and methods for enabling transmission of cellular technology (e.g., 4G-LTE/5G-NR) with unlicensed (e.g., NR-U, LTE-LAA, or LTE-U) or quasi-licensed spectrum (e.g., CBRS) are disclosed.

In a further aspect, apparatus and methods for providing local outdoor cellular or AP functionality via a node is disclosed. In one embodiment, the apparatus and methods utilize a secondary band of wireless chipset capability (e.g., 2.4 GHz for WLAN) for providing the outdoor capability via antenna mounted on the node, the node mounted or disposed in e.g., a publicly accessible place. In one variant, MSO subscribers are given sole access or priority of use of the ad hoc outdoor WLAN or cellular capability.

In another aspect, methods of retaining value of an MSO infrastructure investment are disclosed. In one embodiment, the methods include repurposing uses of an existing coaxial cable installed base (such as in an MDU) so as to extend its usable lifetime and at least delay (if not obviate) its replacement.

In a further aspect, apparatus and methods for shifting a frequency of LBT signal are disclosed.

In yet an additional aspect, apparatus and methods for shifting a frequency of TDD signal are disclosed.

In an additional aspect, apparatus and methods for shifting frequency of an FDD signal are disclosed.

In an additional aspect, apparatus and methods for splitting and combining power and signals onto a coaxial cable are disclosed.

In a further aspect, apparatus and methods for communicating with an external cellular source are disclosed.

In another aspect, apparatus and methods for providing Wi-Fi AP service are disclosed.

In another aspect, apparatus and methods for using a controlling entity to control a switch for mapping inputs of signals from a Wi-Fi AP onto ports of a Wi-Fi STA are disclosed.

In yet an additional aspect, a network architecture implementing one or more of the foregoing aspects of the disclosure are disclosed.

In yet an additional aspect, a software architecture implementing one or more of the foregoing aspects of the disclosure are disclosed.

In a further aspect, a frequency shifting architecture is disclosed. In one embodiment, the architecture includes a plurality of frequency shifters to accommodate two or more different multiple access schemes and associated frequency bands. In one variant, a first set of shifters is utilized in conjunction with an 802.11 chipset (operating via LBT and/or CSMA/CD protocols), while a second set of shifters is used in conjunction with a 3GPP chipset (operating via FDD or TDD protocols).

In another aspect, methods and apparatus for controlling two or more client devices so as to enable utilization of a common bearer medium is disclosed. In one embodiment, the methods and apparatus include use of a controller entity which coordinates switching components within the respective client devices so as to access waveforms associated with different spatial diversity channels encoded on a coaxial cable bearer so as to optimize data rates to each of the different client devices.

In another aspect, an optical to coaxial cable transducer that can transmit and receive IEEE Std. 802.11 and 3GPP 4G LTE and 5G NR waveforms to multiple CPE through a single coaxial cable is disclosed.

In still a further aspect of the disclosure, a method for providing ad hoc mobile device broadband is described. In one embodiment, the method includes providing wireless coverage via one or more external (e.g., pole mounted) access nodes.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a computer readable storage apparatus implementing one or more of the foregoing aspects is disclosed and described. In one embodiment, the computer readable apparatus includes a program memory, or an EEPROM. In another embodiment, the apparatus includes a solid state drive (SSD) or other mass storage device. In another embodiment, the apparatus includes a USB or other "flash drive" or other such portable removable storage device. In yet another embodiment, the apparatus includes a "cloud" (network) based storage device which is remote from yet accessible via a computerized user or client electronic device. In yet another embodiment, the apparatus includes a "fog" (network) based storage device which is distributed across multiple nodes of varying proximity and accessible via a computerized user or client electronic device.

In a further aspect, an optical-to-coaxial cable transducer that can transmit and receive 3GPP 4G LTE and 5G NR waveforms to multiple CPE through a single coaxial cable interface is disclosed.

In a further aspect, a method of introducing expanded data network services within a network infrastructure are disclosed. In one embodiment, the network includes an HFC cable network.

These and other aspects shall become apparent when considered in light of the disclosure provided herein.

Figure 1A:
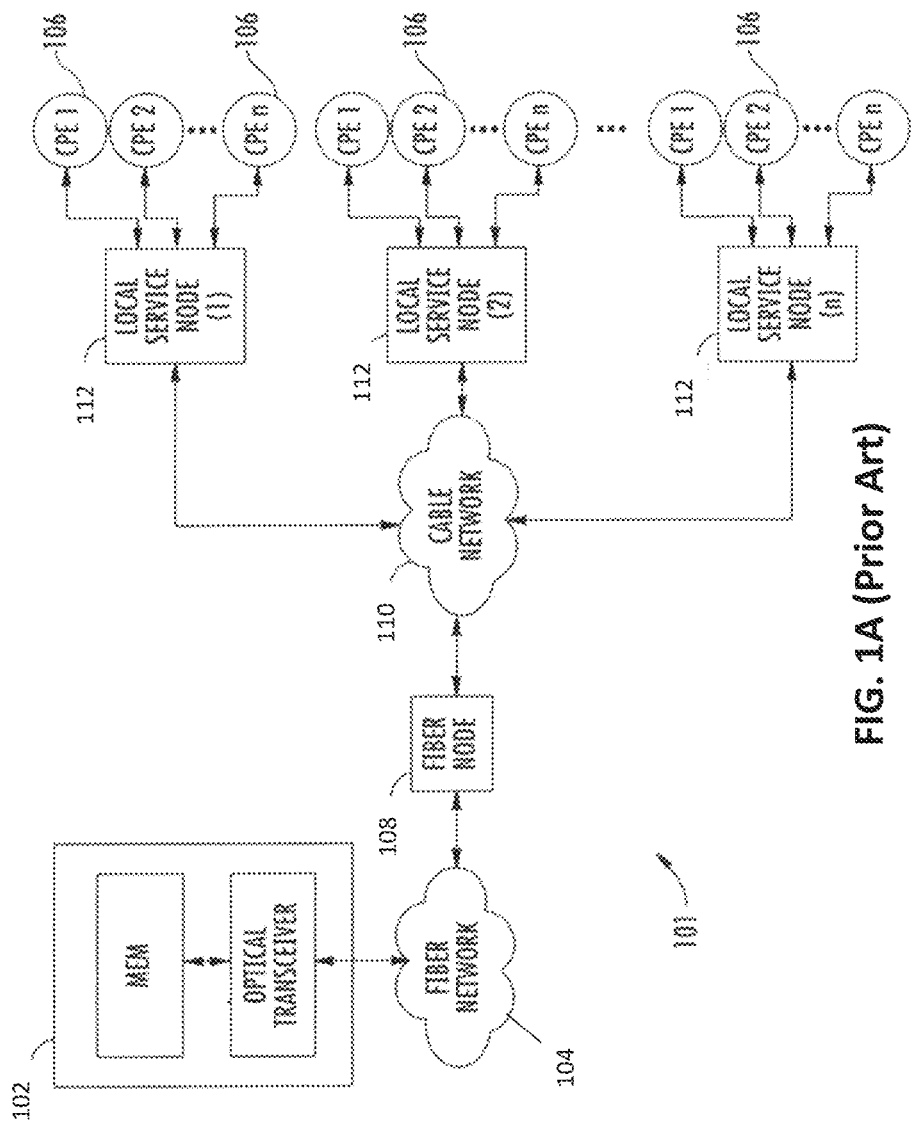
FIGS. 1A and 1B are functional block diagrams illustrating a typical prior art managed (e.g., HFC cable) content delivery network architecture.

All Figures© Copyright 2019-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1.3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2 SDRAM, EDO/ FPMS, RLDRAM, SRAM, "flash" memory (e.g., NAND/ NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a FWA/CPE or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11a/b/g/n/s/v/ac/ad/ax/ba or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3GPP/3GPP2, HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

In one exemplary aspect, the present disclosure provides improved network architectures, and node apparatus and associated methods for providing enhanced ultra-high data rate services which, inter alia, leverage existing managed network (e.g., cable network) infrastructure. Advantageously, the disclosed architectural components (nodes, amplifiers and counterpart CPE) can be utilized in a variety of topologies, with network nodes disposed so as to support multiple downstream CPE including e.g., wherever an optical waveform is to be converted to a signal to be transmitted via coaxial cable. For instance, in one configuration, a node may be used further back towards the service provider core, such as to support a number of individual customer premises (e.g., homes) served by coaxial cable infrastructure. In another configuration, the node may be used at the very edge of the network to service a number of customers within a residential multi-dwelling unit or MDU (e.g., apartment building or condominium complex), that is wired with coaxial cable yet served by a proximate fiber drop (e.g., FTTC).

Further, other exemplary configurations can support various types of use cases (including premises-specific ones) such as e.g., providing an outdoor small cell service, a distributed antenna system (DAS) for an enterprise or other such premises, a venue-specific DAS, and additional reliability through redundancy. Numerous other configurations are possible when utilizing the adaptable and application-specific configurability of the methods and apparatus described herein.

In one embodiment of the architecture, a Hybrid Fiber Coax (HFC) plant infrastructure and 802.11ax (colloquially termed "Wi-Fi 6") protocols are used as bases for provision of standards-compliant ultra-low latency and high data rate services (e.g., with capabilities associated with 3GPP 4G and 5G, and IEEE Std. 802.11 services based on 802.11ax technology). These services may include symmetric or asymmetric US and DS bandwidth which can be dynamically allocated, flexible scheduling of data (to e.g., prioritize real-time data over non-real-time data), and support of cellular, WLAN and PAN (e.g., IoT) services, all via a common service provider. The exemplary use of Wi-Fi 6 technology provides not only the capability for symmetric operation of downstream (DS) and upstream (US) transmissions but also a symmetric capacity, which may not be possible with e.g., use of an 802.11ac router backhauled by DOCSIS.

Further, various configurations and topologies, made available via the aforementioned technologies and the HFC plant infrastructure, are used for provision of various types standards-compliant ultra-low latency and high data rate services to user devices disposed at edge of a distribution network, as well as within different types of venues, which may otherwise pose various challenges or impediments to the provision of such high level of data services.

In one variant, an expanded frequency band (approximately 1.6 GHz in total bandwidth) is used over the coaxial portions of the HFC infrastructure. This expanded band is allocated to two or more primary data sub-bands, as well as to ISM and cellular uses. Wideband amplifier apparatus are used to support DS and US utilization of the sub-bands within the network, including by premises devices via re-use of coaxial infrastructure. This allows the entity that installed such coaxial infrastructure to maintain its footprint in its customer's premises and continue to provide additional services without laying any significant amounts of optical fiber or other such alternate solutions.

In another variant, the foregoing expanded frequency band is divided among and used by two (or more) sub-nodes to provide data services that are better suited to different types of user premises or use cases. Additionally, the division of the expanded frequency band allows the sub-nodes to carry less capabilities/components so as to allow e.g., lower per-unit cost.

In yet another variant, the use of 802.11ax APs for delivery of ultra-high data rate services allow e.g., 4.8 Gbps data rate services, which can allow for example two (2) users to take advantage of 2.4 Gbps data rate in parallel (instead of allowing one (1) user to get all of 4.8 Gbps due to silicon limitation). In another variant, a plurality of access and modulation scheme, such as an OFDM and TDD/FDD/LBT-based scheme is used to allow for maximal efficiency and flexibility in allocating bandwidth to downstream and upstream transmissions over the HFC infrastructure.

Moreover, latency within the disclosed infrastructure is reduced by, inter alia, obviating encapsulation and other network/transport protocols normally necessitated through use of e.g., DOCSIS bearers and equipment (i.e., DOCSIS modems and CMTS apparatus within the MSO core.

Using Wi-Fi protocols such as 802.11ax through HFC also enables broadband service benefits stemming from the rich feature set, vendor diversity and operational reliability that Wi-Fi ecosystem (which is being innovated at a high frequency) has already developed for a multitude of users of Wi-Fi technology in various devices. Furthermore, the exemplary embodiments can help streamline the delivery of broadband services (including increased service velocity) and the roadmap for service improvement by aligning the technology used to deliver broadband data to the customers' premises with the technology used by customers to consume the broadband data (e.g., Wi-Fi).

The improved architecture also advantageously facilitates mobility support by re-purposing one or more spectrum (e.g., 5-85 MHz) typically used as upstream spectrum for DOCSIS for cellular signal extension and distribution (including both at the intermediary network nodes and the end-user's CPE).

DETAILED DESCRIPTION OF EXEMPLARY EMBODIMENTS

Exemplary embodiments of the apparatus and methods of the present disclosure are now described in detail. While these exemplary embodiments are described in the context of the previously mentioned HFC cable system adapted for use with 802.11ax and 3GPP technology, and network nodes and CPE associated with or supported at least in part by a managed network of a service provider (e.g., MSO), other types of radio access technologies ("RATs"), and other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., commercial/retail, or enterprise domain (e.g., businesses), or even governmental uses.

Additionally, while described primarily with reference to exemplary architectures and components set forth in co-owned and co-pending U.S. patent application Ser. No. 16/788,138 filed Feb. 11, 2020 and entitled "APPARATUS AND METHODS FOR PROVIDING HIGH-CAPACITY DATA SERVICES OVER A CONTENT DELIVERY NETWORK," previously incorporated herein by reference in its entirety, the methods and apparatus of the present disclosure are not so limited, and in fact may adapted for use with other architectures and components by one of ordinary skill when given the present disclosure.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Exemplary Network Architecture

As a preliminary matter, it is useful to understand extant cable system topology and operation so that the various aspects of the present disclosure may be more clearly distinguished and contrasted.

Figure 1B:
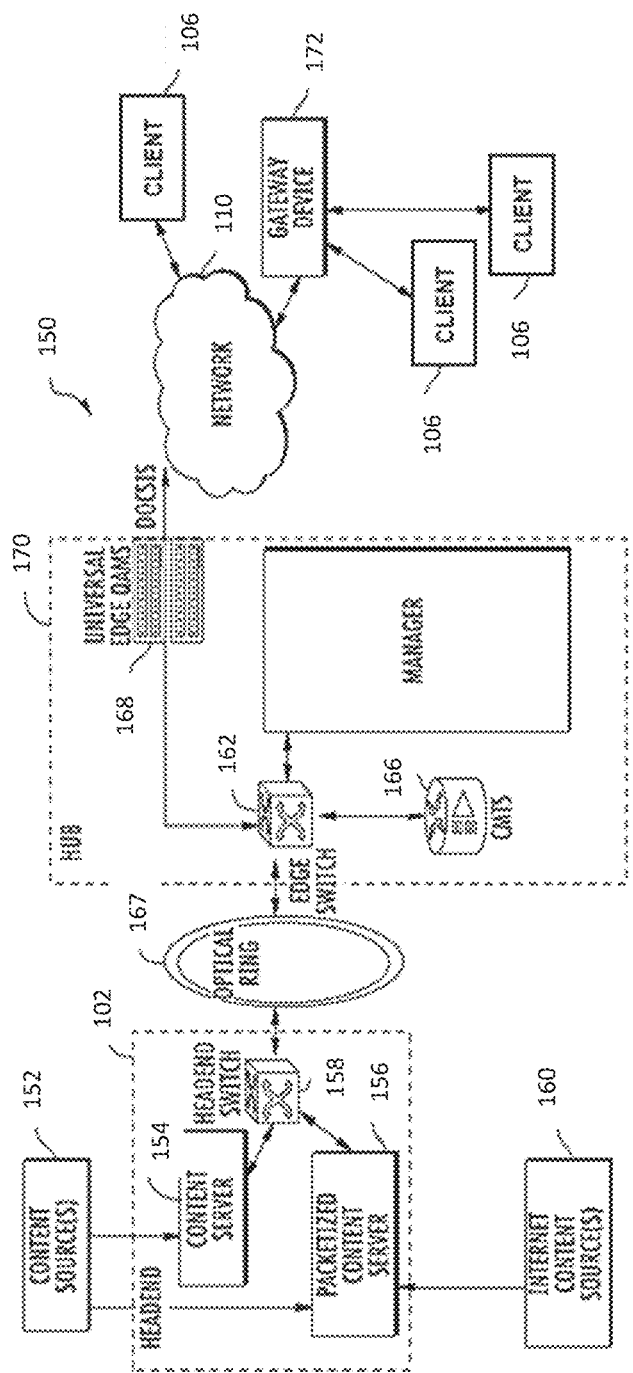

Under existing paradigms, network operators deliver data services (e.g., broadband) and video products to customers using a variety of different devices, thereby enabling their users or subscribers to access data/content in a number of different contexts, both fixed (e.g., at their residence) and mobile (such as while traveling or away from home). FIGS. 1A and 1B are functional block diagrams illustrating a typical prior art managed (e.g., HFC) content delivery network architecture used to provide such data services.

In such networks, data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via their hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), transmitted via e.g., statistical multiplex into a multi-program transport stream (MPTS) on 6 MHz radio frequency (RF) channels for receipt by the subscribers via RF tuners, de-multiplexed and decoded, and rendered on the users' rendering devices (e.g., digital TV) according to the prescribed coding format.

Within the cable plant, VOD and so-called switched digital video (SDV) may also be used to provide content, and via utilization of a single-program transport stream (SPTS) delivery modality. In U.S. cable systems for example, downstream RF channels used for transmission of television programs are 6 MHz wide, and occupy a multitude of 6-MHz spectral slots between 54 MHz and 860 MHz. Upstream and "out of band" communications are normally relegated to the lower end of the available spectrum, such as between 5 and 85 MHz. Deployments of VOD services have to share this spectrum with already established analog and digital cable television services such as those described above. Within a given cable plant, all homes that are electrically connected to the same cable feed running through a neighborhood will receive the same downstream signal. For the purpose of managing e.g., VOD services, these homes are grouped into logical groups typically called Service Groups. Homes belonging to the same Service Group receive their VOD service on the same set of RF channels.

VOD service is typically offered over a given number (e.g., 4) of RF channels from the available spectrum in cable. Thus, a VOD Service Group consists of homes receiving VOD signals over the same 4 RF channels.

In most cable networks, programs are transmitted using MPEG (e.g., MPEG-2) audio/video compression. Since cable signals are transmitted using a Quadrature Amplitude Modulation (QAM) scheme, available payload bitrate for typical modulation rates (e.g., QAM-256) used on HFC systems is roughly 38 Mbps. For example, in many VOD deployments, a typical rate of 3.75 Mbps is used to send one video program at resolution and quality equivalent to NTSC broadcast signals. In digital television terminology, this is called Standard Definition (SD) television resolution. Therefore, use of MPEG-2 and QAM modulation enables carriage of 10 SD sessions on one RF channel (10×3.75=37.5 Mbps<38 Mbps). Since a typical Service Group consists of 4 RF channels, 40 simultaneous SD VOD sessions can be accommodated within a Service Group.

Entertainment-quality transmission of HD (High Definition) signals requires about four times as much bandwidth as transmission of SD signals. For an exemplary MPEG-2 Main Profile-High Level (MP@HL) video compression, each HD program requires around 15-Mbps bitrate.

Hence, in sum, existing cable systems utilize what in effect amounts to an FDM system with 6 MHz channels and roughly 700 MHz of available bandwidth capacity in total, each of the channels being QAM modulated and delivered to the end user via e.g., a tree-and-branch type of topology, with user's CPE (e.g., digital settop boxes, DOCSIS modems, and gateways) utilizing RF tuners to tune to the appropriate DS channels to receive their respective data or program streams. As previously noted, this approach has limitations on its capacity, and hence can only be expanded so far in terms of available bandwidth (both DS and US), and serving additional customers with additional services.

Accordingly, a new model is needed. As shown in the exemplary frequency plan 200 of FIG. 2, various embodiments of the present disclosure utilize two bands 202, 204 each comprised of four (4) 160-MHz-wide channels 210, the two bands as supported by each of two (2) 802.11ax-based APs (see discussion of FIGS. 4-5 infra), can each provide a symmetric data service at the rate of 4.8 Gbps. Due to extant silicon limitations in current 802.11ax chipsets as of the date of this disclosure, the entirety of the 4.8 Gbps bandwidth cannot be allocate to a single user; however, such capability is incipient, and the present disclosure explicitly contemplates such configurations. However, even under the existing silicon, two (2) users can each utilize up to 2.4 Gbps in parallel. Therefore, the two (2) 802.11ax APs can provide a very high data rate service by utilizing the two sets of four (4) 160-MHz channels.

Figure 2:
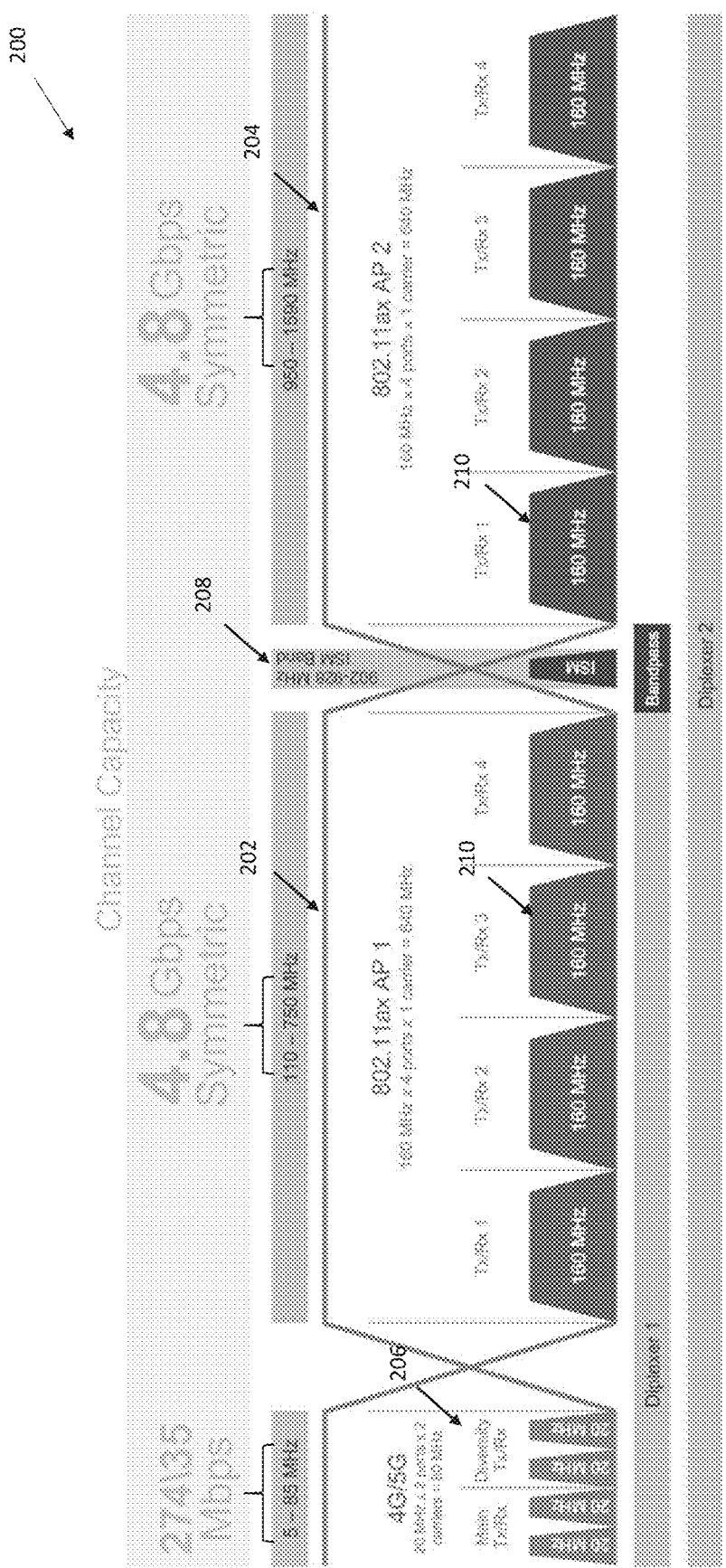
FIG. 2 is a graphical representation of an exemplary frequency band functional assignment according to an embodiment of the present disclosure.

Moreover, the frequency use plan 200 of FIG. 2 includes provision for other functions (in addition to symmetric or asymmetric primary band uses), including support of cellular waveforms provided via 5-85 MHz band 206 (which as noted previously is generally used for upstream data communication for DOCSIS or OOB communication in traditional cable systems), as well as data communication via one or more ISM bands 208 (e.g., at 902-928 MHz).

As will be described in greater detail below, the cellular band(s) 206 can support transmission of e.g., 3GPP 4G/4.5G/5G waveforms to and from the customer's premises, in effect making the MSO's system a huge DAS (distributed antenna system) for a cellular operator or MNO, or even the MSO itself when acting as a wireless service provider. For instance, in one such model, the MSO may use 3GPP-based technology as an underpinning for providing unlicensed or quasi-licensed service via e.g., NR-U bands, CBRS bands, C-Band, or even mmWave bands to its users or subscribers.

Similarly, the ISM band(s) 210 within the frequency plan 200 provide a number of different functions to aid in, among other things, CPE control and fault detection by the MSO.

As shown in FIG. 2, the overall spectrum utilized by the plan 200 is on the order of 1.6 GHz, roughly twice that of a typical MSO cable band under the prior art. Notably, the portions of the extant HFC architecture leveraged as part of the architectures of the present disclosure are not inherently limited by their medium and architecture (i.e., optical fiber transport ring, with coaxial cable toward the edges); coaxial cable can operate at frequencies significantly higher than the sub-1 GHz typically used in cable systems, and such additional bandwidth is made use of in the exemplary embodiments described herein.

Figure 2A:
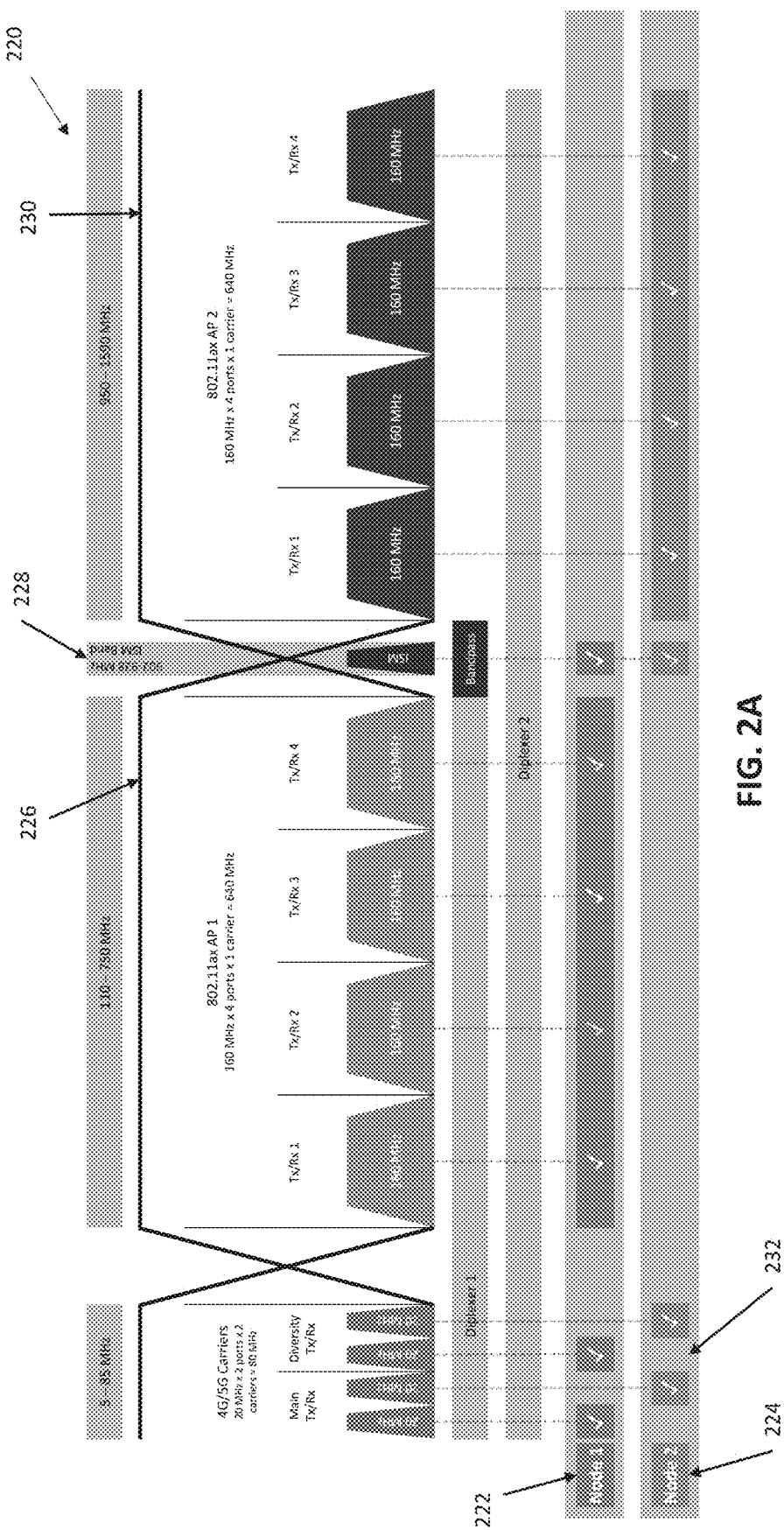
FIG. 2A is a graphical representation of another exemplary frequency band functional assignment according to an embodiment of the present disclosure.

Further, the foregoing spectrum of e.g., 1.6 GHz in bandwidth can be divided between multiple (e.g., two (2)) sub-nodes to allow, inter alia, a spectrum use plan that can be advantageous in providing data services that are more tailored to user premises and/or applications being served. For example, as shown in the embodiment of FIG. 2A, the plan 220 allocates approximately 700 MHz of bandwidth to one sub-node (Node 1) 222 while allocating another approximately 700 MHz of bandwidth to another sub-node (Node 2) 224. The division can be used for a multitude of purposes, including e.g., providing high-capacity data services to different parts of one or more user premises, via two or more nodes providing different paths (including combining or alternating such paths to provide e.g., additional reliability through redundancy), as discussed in more detail elsewhere herein.

As can be seen in FIG. 2A, one sub-node 222 can be allocated e.g., 640 MHz of bandwidth 226 that can be serviced by one (1) 802.11ax AP, while another sub-node 224 can be allocated another 640 MHz of bandwidth 230. As discussed further herein, each node can generate and/or provide its own data to be transmitted via ISM band 228, which is a shared-use channel. Accordingly, each sub-node 222, 224 can utilize the ISM band 228 as shown in FIG. 2A, to e.g., send control data. Furthermore, the cellular band(s) 232, as introduced with respect to FIG. 2 above, can also be divided between the two sub-nodes 222, 224 as needed by e.g., utilizing one or more carrier signals or bands for each sub-node 222, 224 (e.g., in 20 MHz wide slices) as shown in FIG. 2A.

Figure 2B:
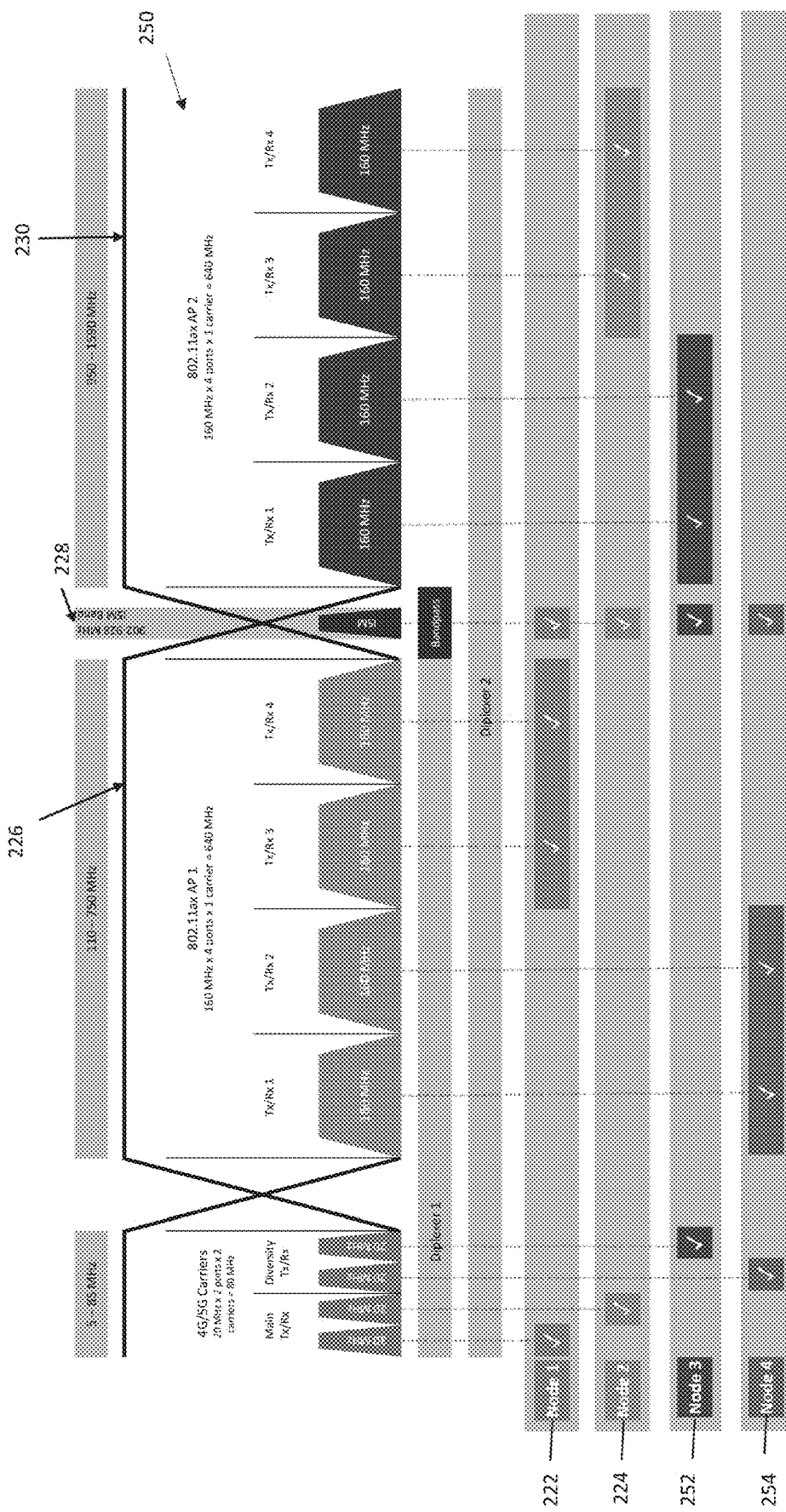
FIG. 2B is a graphical representation of yet another exemplary frequency band functional assignment according to an embodiment of the present disclosure.

FIG. 2B illustrates yet another embodiment of a frequency plan 250 according to the present disclosure. In this plan, there are four (4) nodes 222, 224, 252, 254 which are each allocated a cellular band, two sub-band portions (of the four total comprising the bandwidth 226, 230), and use a common ISM band 228.

It will also be appreciated that the attenuation associated with any coaxial cable infrastructure is a function of, inter alia, coaxial conductor length, and hence higher levels of "per-MHz" attenuation may be acceptable for shorter runs of cable. Stated differently, nodes servicing (or serviced by) shorter runs of cable may be able to better utilize the higher-end portions of the RF spectrum (e.g., on the high end of the aforementioned exemplary 1.6 GHz band) as compared to those more distant, the latter requiring greater or disproportionate amplification. As such, the present disclosure also contemplates embodiments which make use of selective mapping of frequency spectrum usage as a function of total cable medium run length or similar.

Accordingly, referring now to FIGS. 3A-3D, various embodiments of an enhanced service provider (e.g., cable MSO) network architecture making use of the exemplary frequency plans of FIGS. 2-2B are shown and described in detail. As described in greater detail subsequently herein, each of the architectures 300, 320, 340, 360 of FIGS. 3A-3D make use of an existing, developed technology "ecosystem" as a basis of its new data and signal processing and delivery capabilities (in both DS and US directions). This use of much of the existing "last mile" of infrastructure, and existing high-performance wireless components, advantageously obviates much of the previously discussed long development cycles and R&D costs associated with developing components from "the ground up," and accordingly each greatly enhances customer service velocity (i.e., the rate at which new services and capabilities can be added to the system) as well as customer satisfaction and loyalty.

Figure 3A:
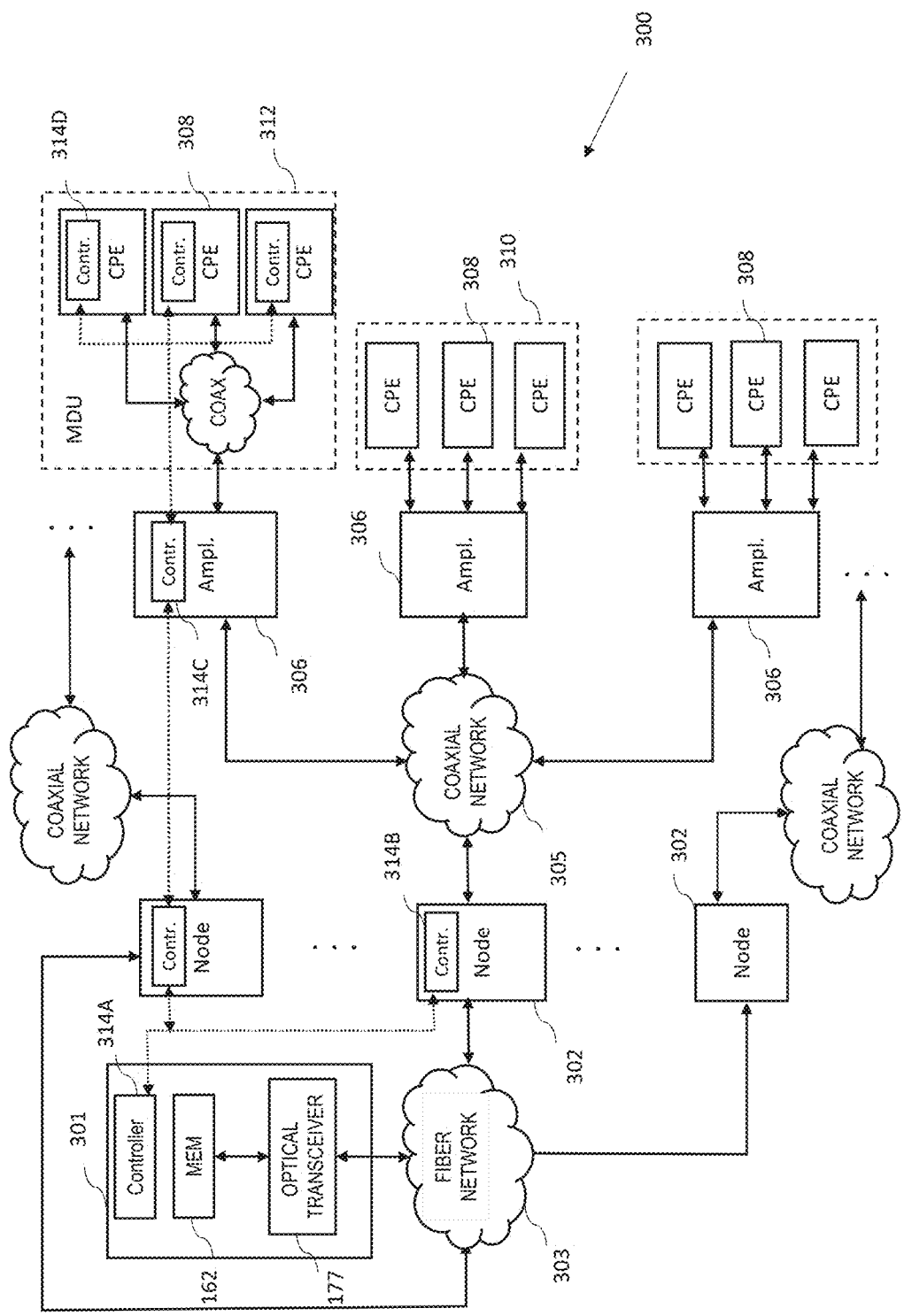
FIG. 3A is a functional block diagram illustrating a first exemplary embodiment of a service provider network architecture according to the present disclosure.

In a first embodiment illustrated in FIG. 3A, the improved network architecture 300 according to the present disclosure includes a headend 301, optical fiber distribution network 303 (e.g., DWDM ring or similar), and a plurality network nodes 302 connected to the network/ring 303 within the MSO network (such nodes which may be e.g., near edge portions of the network, or further towards the core, depending on configuration and the particular portions of the network served). Furthermore, the architecture 300 also includes a plurality of amplifiers 306, which are used to compensate for transmission losses due to the coaxial medium 305 by amplifying the signal in the downstream and upstream directions as required. The architecture 300 also includes a multitude of served CPE 308, which are used to process and transmit signals to end users as described in greater detail below.

As shown in FIG. 3A, in one embodiment of the network architecture 300, the network nodes 302 are backhauled by optical fiber, although this is merely illustrative, as other types of backhauls may be used (e.g., RF wireless such as mmWave systems, or Metro Ethernet with twisted copper).

Also included in the architecture 300 of FIG. 3A are controller entities or processes 314a, 314b, 314c which are in logical communication with one another via e.g., the distribution network architecture. As described in greater detail below, these controller processes enable, inter alia, control by a headend controller 314a of the nodes and amplifiers for configuration and re-configuration of the devices during operation, such as to reallocate frequency spectrum, change modulation/coding schemes (MCS) on the various devices, and enable ISM-band based functionality.

Returning to FIG. 3A, a plurality of taps (not shown) and the amplifiers 306 are utilized to distribute signals to the multitude of CPE 308, which may be disposed as groups of individual premises/customers 310 with respective CPE 308 served by a given amplifier and "branch" of the coaxial topology, or alternatively as groups of CPE 308 within aggregated premises such as MDUs, enterprise or educational campuses or similar 312. As shown, in the case of the MDUs/campuses 312, the target premises includes an indigenous coaxial cable network (whether star, tree, or other topology), such as may have been installed at time of construction of the building(s) served. It will be appreciated that any number and topology of network nodes 302, taps, amplifiers 306, and CPE 308 can be used to deliver high-capacity data services to the CPE 308 that are disposed at customer premises of residential customers as well as enterprise, educational, government/military, or other types customers.

The MSO network architecture 300 of FIG. 3A is particularly useful for the delivery of packetized content (e.g., encoded digital content carried within a packet or frame structure or protocol) consistent with the various aspects of the present disclosure. In addition to on-demand and broadcast content (e.g., live or "linear" video programming), the system of FIG. 3A can deliver and receive Internet data and OTT (over-the-top) services to the end users via the Internet protocol (IP), although other protocols and transport mechanisms of the type well known in the digital communication art may be substituted. Moreover, as discussed in greater detail below, the architecture also includes provision for cellular service, ISM band service, and WLAN backhaul, as well as supporting low-latency functionality of the user such as distributed gaming and AR/VR application support.

The architecture 300 of FIG. 3A further provides a consistent and seamless user experience with IPTV or streaming media over both wireline and wireless interfaces. Additionally, in the IP paradigm, dynamic switching between unicast delivery and multicast/broadcast can be used based on e.g., local demand. For instance, where a single user (device) is requesting content, an IP unicast can be utilized. For multiple devices (i.e., with multiple different IP addresses, such as e.g., different premises), multicast can be utilized where similar content is delivered. This approach provides for efficient and responsive switching of delivery and obviates other more equipment/CAPEX-intensive approaches.

Moreover, the architecture can be used for both broadband ("Internet") data delivery as well as simultaneous delivery of "content" (e.g., movie channels), and obviates much of the need for a separate infrastructure for "in band" and DOCSIS (and "out of band" (OOB)) transport.

In certain embodiments, the service provider network 300 also advantageously permits the aggregation and/or analysis of subscriber- or account-specific data. As but one example, device-specific IDs can be cross-correlated to MSO subscriber data maintained at e.g., the network head ends (not shown) so as to permit or at least facilitate, among other things, (i) user/device authentication to the MSO network; (ii) correlation of aspects of the area, premises or venue where service is provided to particular subscriber capabilities, demographics, or equipment locations, such as for delivery of location-specific or targeted content or advertising; and (iii) determination of subscription level, and hence subscriber privileges and access to certain services as applicable. Moreover, device profiles for particular devices can be maintained by the MSO, such that the MSO (or its automated proxy processes) can model the device for wireless or other capabilities.

Figure 3B:
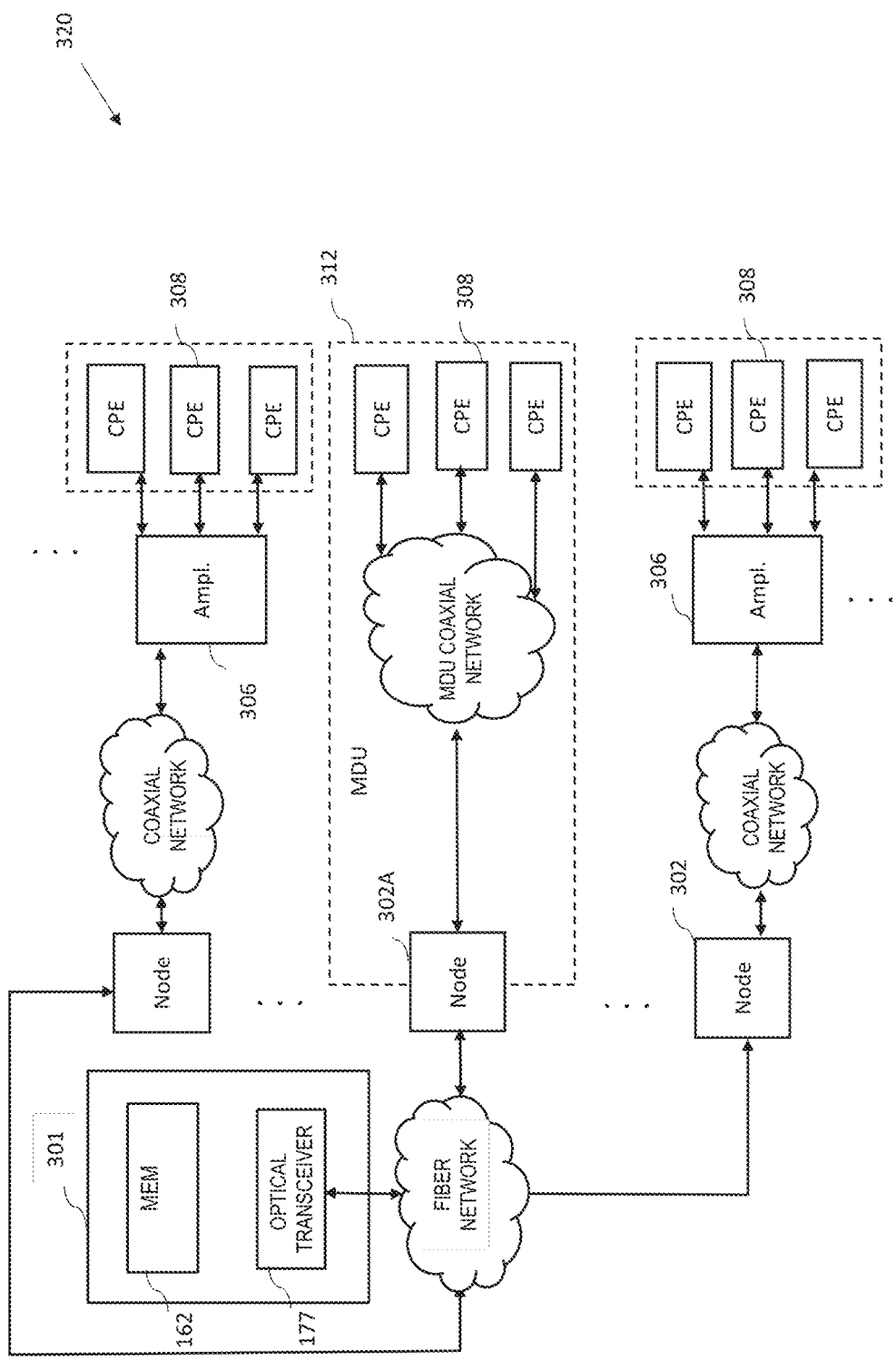
FIG. 3B is a functional block diagram illustrating a second exemplary embodiment of a service provider network architecture according to the present disclosure.

FIG. 3B illustrates another embodiment of the network architecture 320, wherein both groups of individual premises 310 and MDUs or similar 312 are served. In this embodiment, one or more "local" nodes 302a are used to deliver MSO data and signals directly to the MDU 312 and its local (premises) coaxial distribution network without need of an interposed amplifier 306. For instance, the MDU 312 may have an optical fiber drop (e.g., FTTC or FTTH) node proximate thereto or serving the premises (whether via the MSO as in FIG. 3B, or a third party service provider network 344 as shown in FIG. 3C), such that the node 302a can be used to directly serve the MDU premises 312, such as being mounted on a utility pole proximate the premises, or in the case where the node 302a serves only the premises, integrated within the premises itself (e.g., in a telecommunications service ingress/egress room or similar).

In yet other configurations (not shown), the node 302a may be associated with a wireless backhaul (e.g., a roof-mounted antenna/FWA apparatus, such as one utilizing quasi-licensed CBRS spectrum for backhaul).

It will also be recognized that the node 302a may be dedicated to a given premises or MDU 312 (e.g., a "micro-node"), or alternatively be scaled accordingly to serve multiple local MDUs 312 (not shown).

Figure 3C:
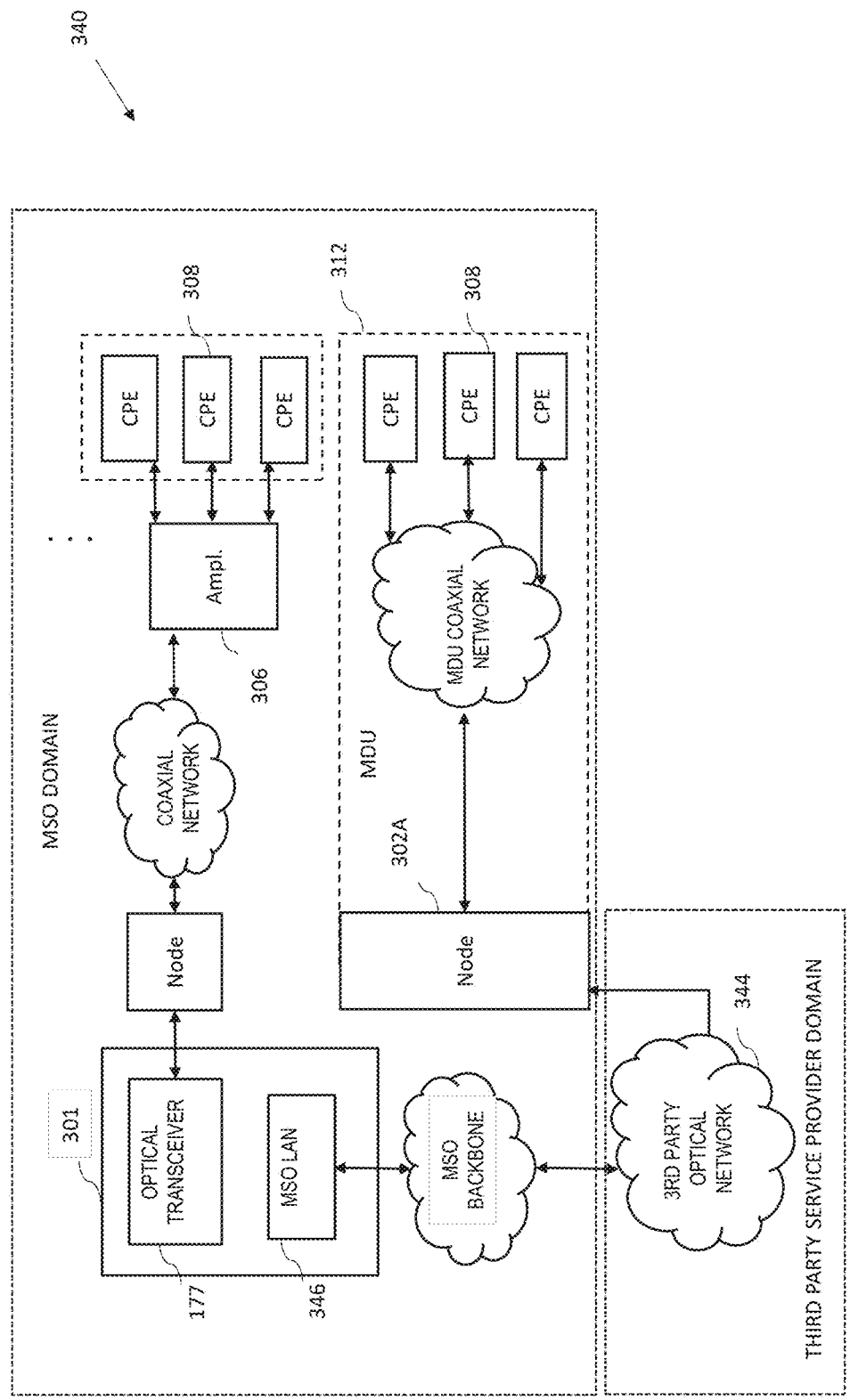
FIG. 3C is a functional block diagram illustrating a third exemplary embodiment of a service provider network architecture according to the present disclosure.

In the architecture 340 of FIG. 3C, one or more nodes in direct communication with the MSO optical network 177 serve a plurality of premises and CPE 308 via one or more interposed amplifiers 306, while one or more MDUs 312 are served by "direct feed" nodes 302a, the latter backhauled by a third-party service provider network 344 such as a FiOS or FTTC provider separate from the MSO.

Figure 3D:
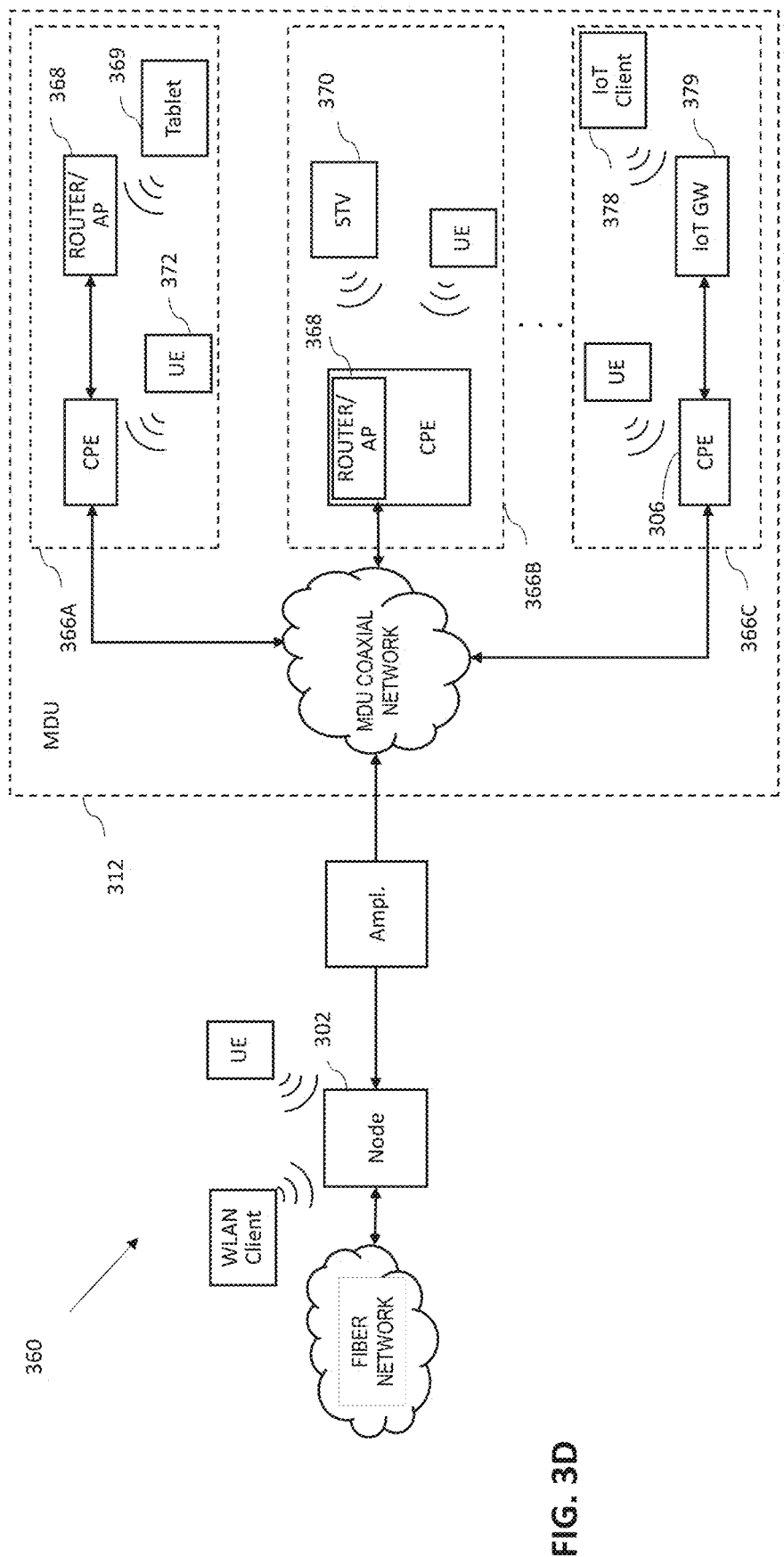
FIG. 3D is a functional block diagram illustrating an exemplary embodiment of a client-side architecture (in the context of an MDU) served by a service provider network architecture.

FIG. 3D is a functional block diagram illustrating an exemplary embodiment of a client-side architecture 360 (in the context of an MDU) served by a service provider network architecture such as one of those of FIGS. 3A-3C. As shown, the node 302, which may be backhauled by e.g., an optical fiber network of the MSO or another service provider, acts as both (i) a backhaul for the MDU 312 and its individual subscribers/users 366a, 366b, 366c, as well as (ii) an ad hoc access node for e.g., WLAN clients (i.e., those operating in one embodiment in the unused 2.4 GHz band associated with the 802.11ax chipsets of the node) as well as user mobile devices such as 3GPP-compliant UE (i.e., the node 302 acts as a cellular repeater or DAS of sorts) by virtue of the node's 3GPP functionality described in greater detail below with respect to FIGS. 4-8).

In terms of MDU premises services, the node 302 may backhaul UE 372 (whether operating in a licensed cellular band or in an unlicensed or quasi-licensed band such as an NR-U or CBRS or C-band), user mobile WLAN devices such as tablets 369, smart TVs 370 with WLAN capability, and IoT devices such as gateways 379 and/or IoT client devices 378. Various other served premises configurations will be appreciated by those of ordinary skill, including those described further herein with respect to e.g., FIGS. 9-12.

It will also be appreciated that the frequency plan 200 of FIG. 2 may be constructed so as to co-exist with other premises media or protocols which may utilize the indigenous cable medium such as e.g., MoCA 2.0, 2.1, 2.5, or 3.0 systems (whether using channel bonding or otherwise). For instance, in one approach, dynamic spectrum utilization (e.g., for the upper band 204) may be programmed to avoid certain bands which are being utilized or may be occupied by the other systems. In one variant, the controller (discussed below) is informed of such actual occupied or putatively occupied bands by e.g., the MoCa adapter or other such device operative in the premises. In another approach, an LBT or similar medium access approach is used to avoid contention with such systems.

Moreover, while shown primarily in optical backhaul configurations (e.g., the node(s) 302 acting as the boundary between the optical of RF coaxial domains), the nodes 302 may be adapted to utilize other backhaul.

In another aspect of the disclosure, an architecture for providing high data rate, low latency coverage to e.g., large indoor spaces such as office buildings, enterprises, universities, MDUs, etc. is disclosed. One implementation of this architecture utilizes one or more of the foregoing network nodes 302 to supply one or more CPE 308 within the enterprise, etc. via HFC infrastructure, such as a star, bus, ring, tree, or other coaxial cable topology within the served premises. The CPE, by virtue of their repeater/extender functions for cellular and WLAN, provides coverage within the structure for both cellular and Wi-Fi, as well as indoor/outdoor mobility, such as via local pole-mounted access node 302 with 4G/5G and WLAN capability. As such, the CPE collectively act as a distributed antenna system (DAS) for cellular and WLAN signals, as do the intermediary network nodes 302 disposed e.g., at or near the premises in some cases.

Exemplary Network Node Apparatus

Figure 4:
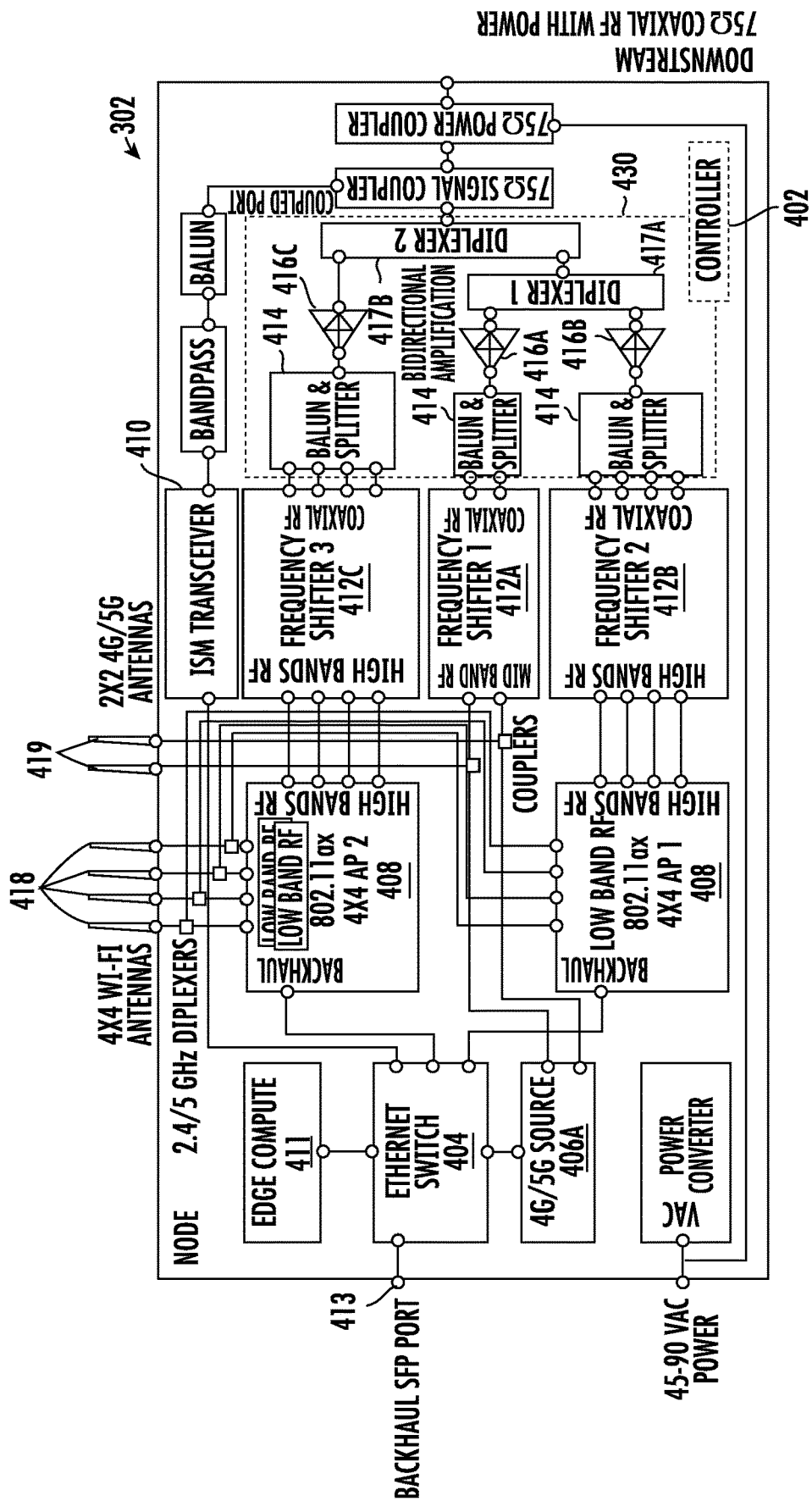
FIG. 4 is a functional block diagram illustrating a first exemplary configuration of a network node apparatus according to the present disclosure.

FIG. 4 illustrates an exemplary embodiment of a network node apparatus 302 configured according to the present disclosure. As shown, this embodiment of the network node 302 includes, inter alia, a controller subsystem 402, an Ethernet switch 404, a cellular source 406A, two (2) 4×4 802.11ax chipsets 408, an ISM transceiver 410, one or more frequency shifters 712, one or more splitters 414, diplexers 716, and 4×4 Wi-Fi antennas 418, and 2×2 cellular antennas 419.

In one variant, the Ethernet switch 404 interfaces with the fiberoptic backhaul via e.g., one or more SET (small form-factor pluggable) ports 413, as well as edge compute apparatus 411 and a cellular source (e.g., of a 4G/5G signal) 406A such as an LTE or 5G NR-based chipset (e.g., a combination of a cellular (4G/5G) baseband processor such as an xNB (eNB or gNB) modem chip and radio frequency integrated circuit (RFIC), akin to the principal components of a small cell) to the Ethernet switch interfaces with the 4×4 802.11ax Wi-Fi AP chipsets 408. As previously referenced, so-called Wi-Fi 6 as available on the 802.11ax Wi-Fi APs 408 can generate carriers of up to 160 MHz of frequency bandwidth (only supported in the 5-GHz spectrum at present).

In one implementation, any resource which is not used from each of the 802.11ax APs 408 (e.g., 2.4 GHz channels, in that the 160-MHz channels are not supported for data communication at 2.4 GHz), can be used to provide ancillary functionality or services from the node, such as e.g., a Wi-Fi AP service to surrounding Wi-Fi devices (e.g., MSO subscribers who happen to be proximate to the node) via 4×4 Wi-Fi antennas 418 (see FIG. 3D). Similarly, the cellular source 406A can provide a local cellular repeater or extender service function (e.g., to local MSO subscribers who happen to be proximate to the node) via e.g., 2×2 cellular antennas 419.

Additionally, one or more frequency shifter modules 412 are used within the node 302 to convert the frequency of the signal(s) to be transmitted downstream to that appropriate for the coaxial cable infrastructure. As shown in the embodiment of the frequency plan 200 of FIG. 2, these bands may include for example 110-750 MHz and 950-1590 MHz bands 202, 204, although it will be appreciated that other bands may be used. Multiple frequency shifter modules 412A-C can be utilized to process signals of different frequency bands, access schemes, and/or types of modulation schemes. For example, the signals received from the 802.11ax AP modules 408 can be of (i) a first frequency band on the cable medium; (ii) OFDM modulation, and (iii) Listen Before Talk (LBT) access type, which in part enable the previously described symmetric capabilities, while the cellular signals from the cellular source 406A may be of either Frequency-Division Duplex (FDD) or Time-Division Duplex (TDD) access on a different frequency band on the cable (e.g., 5-85 MHz). Due to different operation modes and functions, different frequency shifter modules 412A-C can be used to e.g., avoid interference by increasing noise isolation of each signal from one another, and also eliminate the need to coordinate the shifters. In the illustrated architecture, each 802.11ax AP 408 can act independently of the other(s), and be allocated for downstream and upstream transmission of data, as described in greater detail elsewhere herein.

It will be appreciated that, as further advancement is made in the related technology ecosystem (802.11ax in the exemplary embodiment), new bandwidth-related functions such as channel bonding or carrier aggregation can be applied to the aforementioned 160-MHz channels to create even larger capacity channels for data communication, thereby allowing further scalability of parameters or constraints of the system, such as the number of Wi-Fi modules/APs 408 to be used, and any associated number of frequency shifters (or other node components such as baluns, splitters and bidirectional amplifiers) to be used.

Similarly, separate, different bidirectional amplifiers 416 can be utilized to process the e.g., LBT, FDD, and TDD signals of the different US and DS frequency bands. It is noted that the configuration of each bidirectional amplifier in the illustrated embodiment of the node 302 is heterogeneous or asymmetric with respect to its US and DS directions; i.e., each amplifier will operate differently in the US versus the DS, as necessitated by the different signals carried in each direction and the topology of the node (i.e., configuration of the baluns, diplexers, splitters and bidirectional amplifiers relative to one another). As a brief aside, a bidirectional amplifier for an FDD carrier would continuously amplify a different portion of spectrum on the cable for each direction (i.e., upstream and downstream). Conversely, a bidirectional amplifier for a TDD carrier would alternate between amplifying the same portion of spectrum on the cable in the upstream or downstream direction according to e.g., a fixed, configurable or adaptive duty cycle. For fixed or configurable duty cycles, the amplifier can switch between downstream and upstream modes based on e.g., a phase lock loop (PLL) trained on the presence of downstream energy. For adaptive duty cycles, such as with dynamic TDD in 5G NR, the downstream direction can be amplified when the presence of energy in that direction within the allocated spectrum of the cable is detected. The upstream direction can be amplified when energy is not detected in the downstream direction.

A bidirectional amplifier for an LBT carrier would operate the same way as a bidirectional amplifier for a TDD carrier with an adaptive duty cycle. The downstream direction can be amplified when the presence of energy in that direction within the allocated spectrum of the cable is detected. The upstream direction can be amplified when energy is not detected in the downstream direction.

Moreover, depending on placement within that topology, the bidirectional amplifier 416A associated with the first frequency shifter 412A may be different than that 416B of the second frequency shifter 412B, and different than that 416C of the third frequency shifter 412C. It will also be appreciated that the implementation of each bidirectional amplifier apparatus will be readily accomplished by those skilled in the art given the present disclosure.

Furthermore, it will also be appreciated that while 802.11ax AP modules 412 are discussed herein for the advantage of e.g., their developed ecosystem, and ability to use 256-QAM with Wi-Fi 6 (thereby enhancing data rate due to higher order modulation as compared to e.g., 64 QAM of other types of ecosystems), different types of chipsets or ecosystems may be substituted depending on the nature and requirements of the application.

Moreover, it will be recognized that the actual over-the-cable RF frequency for the cellular carrier (e.g., of 5-85 MHz as shown in FIG. 2) can be utilized to e.g., support cellular frequency bands other than nominal cellular frequencies on the order of 1 to 2 GHz, including for example emerging standards operating in higher frequencies such as sub-6 GHz 5G or mmWave 5G devices.

In operation, the diplexers 417A, 417B are tiered or arranged in a hierarchy such that the first diplexer 417A is coupled to the first and second frequency shifters (via the bidirectional amps 416 and the baluns and splitters 414) as well as the second diplexer 417B, the latter also coupled to third frequency shifter 412C and the downstream port (via the signal and power couplers). In this fashion, the signals (e.g., those from the frequency shifters) can be frequency-domain multiplexed onto the output of each diplexer as appropriate for transmission via the downstream port to the amplifier and ultimately the recipient CPE. Similarly, upstream signals received via the couplers are diplexed via diplexer 2 417B to (i) the first diplexer 417A, and (ii) the balun and splitter associated with the third frequency shifter 412C. The first diplexer 417A allows splitting of the signal based on frequency into the cellular components (for the first frequency shifter 412A) and those for the first Wi-Fi AP 408, while the second diplexer 417B splits off the second Wi-Fi AP signals. So, in effect, the node acts as an aggregator or combiner in the DS direction (toward the amplifier and CPE) and a dis-aggregator in the US direction.

Figure 5:
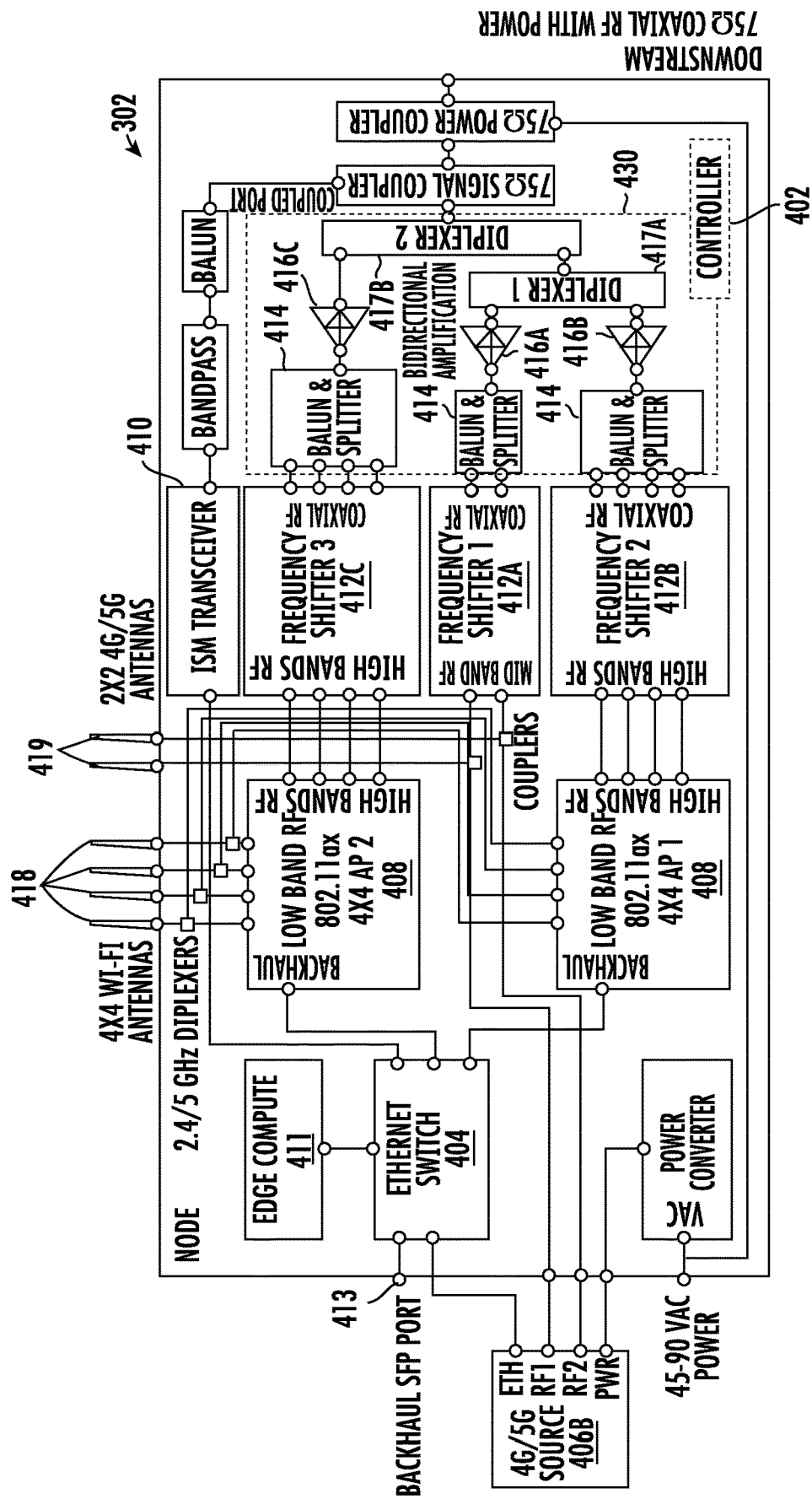
FIG. 5 is a functional block diagram illustrating a second exemplary configuration of a network node apparatus according to the present disclosure.

In another embodiment of the node apparatus, as shown in FIG. 5, an external cellular source 406B can be utilized, instead of an integrated cellular source 406A of the embodiment of FIG. 4. For example, a "first tier" network node vendor which can provide macro cellular capacities (e.g., components capable of serving hundreds or thousands of simultaneously connected users) with appropriate baseband capabilities in hardware and software to support such high capacities, can utilize its own cellular solution as an integrated part of the network node 302. However, for a second-tier network node vendor which lacks the expertise or capacity (e.g., in 3GPP technology) to integrate a cellular solution into its network node 302, it can obtain the cellular solution from an external source, and utilize this solution in conjunction with the network node 302 of FIG. 5. For example, a femtocell for serving 64 or 128 users (e.g., in a small MDU) can be used as an external cellular source 406B for a such Tier 2 node vendor, thereby enabling a broader range of use cases and applications of the various functions of the apparatus and methods of the present disclosure.

As previously discussed, the ISM transceiver 410 of the exemplary node 302 can be used to encode data related to identifying the node, and/or enabling a correct configuration of a switch component of one or more CPE, as described in e.g., co-pending U.S. patent application Ser. No. 16/788, 138, incorporated supra. In one implementation, the ISM transceiver 410 can be used to encode data identifying the node so that such information can be used for pinpointing the location of any RF signal leakage within the signal via e.g., portable or fixed monitor. Per FCC (as outlined at e.g., https://www.fcc.gov/consumers/guides/cable-signal-leakage), there are requirements imposed on network operators to detect any RF signal leakage. Such RF signal leakage can cause for example interference with the licensed frequency spectrum allocated to MNOs. Although the RF signal on any portion of the cables within an HFC network should be contained, any event that may expose the RF signal on the cables to the surroundings (e.g., by mechanical damage to the cable or connectors), the node identifying information communicated via the ISM band can be useful in pinpointing the location of the leak by allowing any entity receiving this information via the ISM band to be able to identify each node by such identifying information.

As previously noted, if RF signal leakage occurs at a higher frequency spectrum of the cable, then leakage will typically also occur within the ISM band, and the controller 402 can radiate ISM-band energy via the ISM transceiver 410 including the identifying information (e.g., MAC address) of the transmitting network node. Because the ISM band is specifically to be used for transmission of these signals, the ISM transceiver 410 need not be connected to any frequency shifter as with the other signal sources (i.e., 802.11ax chipsets and cellular source), as the ISM signal does not require any shift in its frequency. It will be appreciated, however, that different frequencies can be used, and/or some degree of frequency shift can be applied if desired, such as in cases where the available spectrum of the frequency plan is at a higher frequency (e.g., an unlicensed band such as 2.4 GHz). As previously referenced, one benefit of using unlicensed frequency bands for such transmissions is that the transceiver 410 and any receiver used to monitor for leakage of the signals, or receive control information (such as in the CPE), are highly commoditized and hence low cost. Moreover, any "intentional" ISM signals which may leak cause no deleterious radiation in the surrounding environs where the leakage occurs (other than perhaps some additional ISM band interference), and hence the leakage can be detected readily, at low cost, and with no effects on licensed bands.

Figure 6:
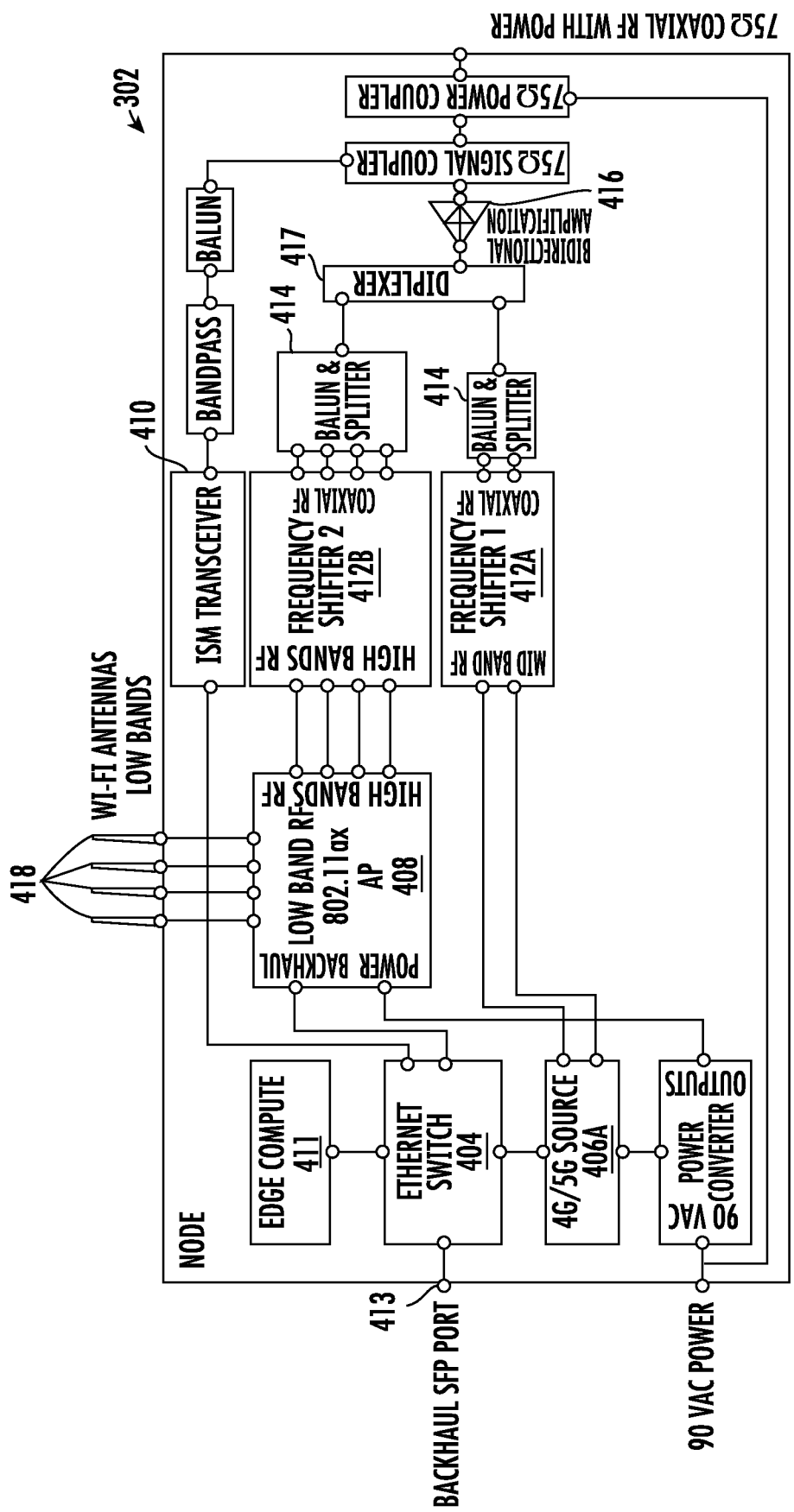
FIG. 6 is a functional block diagram illustrating a third exemplary configuration of a network node apparatus according to the present disclosure.

FIG. 6 illustrates yet another exemplary embodiment of a network node apparatus 302 configured according to the present disclosure. As shown, this embodiment of the network node 302 includes, inter alia, only one (1) 4×4 802.11ax chipset 408 when compared to the embodiments of FIGS. 4 and 5. Accordingly, the network node apparatus 302 of FIG. 6 can be configured and operated in generally the same way as the exemplary embodiment shown in FIG. 4, with an exception of requiring less complexity in configuration and operation. For example, the lone 4×4 802.11ax chipset 408 can be operated to process the divided sub-band 226 with a bandwidth of approximately 640 MHz as discussed elsewhere herein. Because only one (1) 4×4 802.11ax chipset 408 is utilized, the extra components such as an additional frequency shifter 412 used to down-convert a signal from a second 4×4 802.11ax chipset 408 to be transmitted via coaxial infrastructure for DS direction and to up-convert a signal to be processed by the second 4×4 802.11ax chipset 408 for US direction, as well as an additional Balun & Splitter 414, amplifier 416, and diplexer 417 used for combining/splitting the data signals from/for the second 4×4 802.11ax chipset 408, are obviated. The exclusion of the extra components for the network node 302 as described above can e.g., lower the complexity, reduce the form factor, draw less power, and associated cost of the node 302, such as for use in applications where the capacity of only one chipset is required.

Furthermore, as described subsequently herein in greater detail, the foregoing apparatus of the embodiment of FIG. 6 can be useful for e.g., providing redundancy when used in tandem with another one of such node apparatus with reduced capacity. For example, the node 302 can utilize carrier signals of the 3GPP source 406A within one frequency band, while another node 302 can also utilize only carrier signals of its 3GPP source 406A within another frequency band, so as to e.g., provide redundancy of processed data within a user premises (see FIG. 12 for more details).

It will be appreciated that in the foregoing use case scenario (e.g., use of two or more nodes proximate to one another), the ISM band communications (which may use e.g., LoRa as one exemplary solution) will not be impacted because the different ISM transceivers of two or more nodes can transmit signals in the same ISM band without interference with one another such as via use of different carrier frequencies, or alternatively via use of media access protocols.

Figure 7:
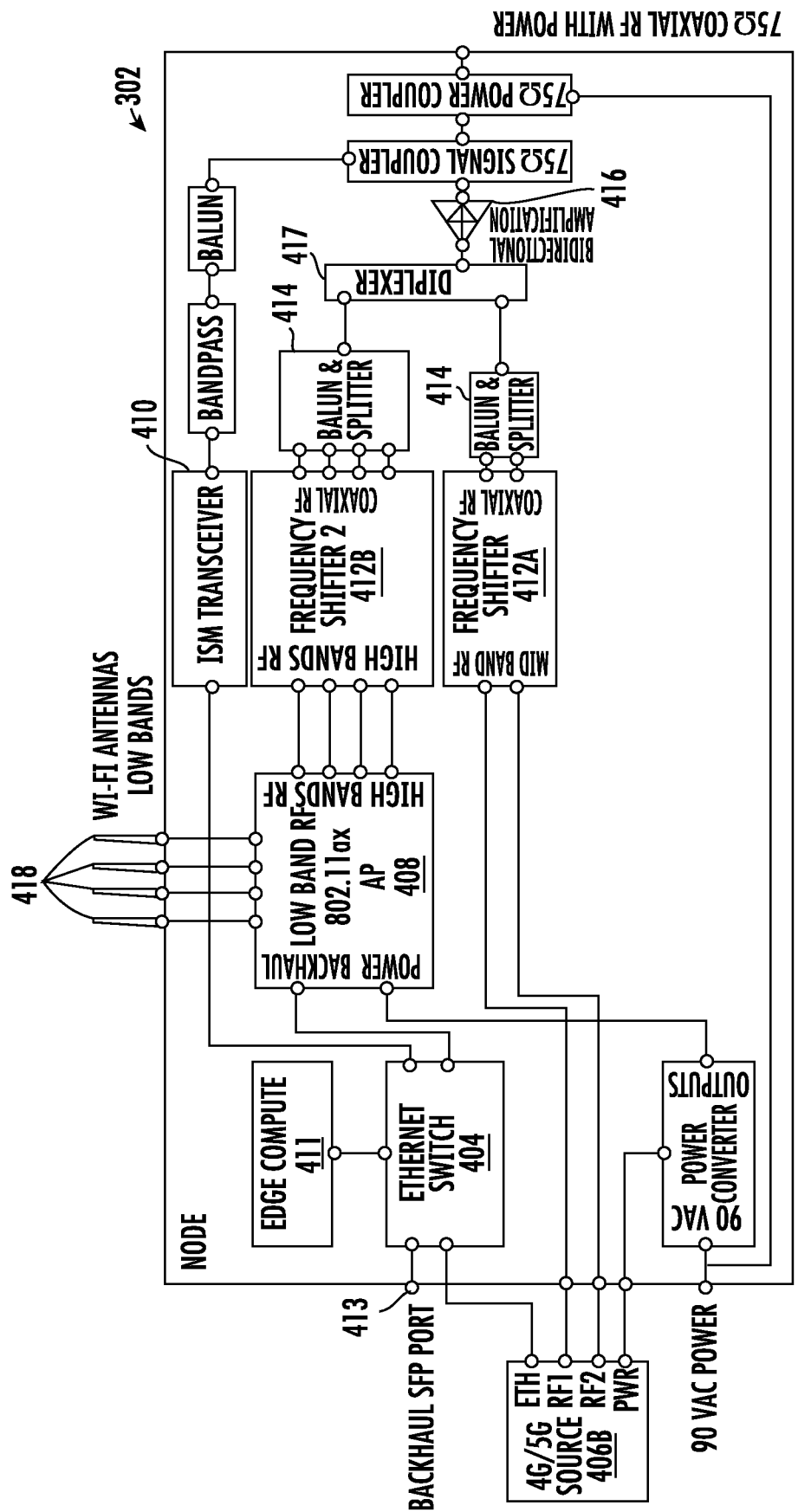
FIG. 7 is a functional block diagram illustrating a fourth exemplary configuration of a network node apparatus according to the present disclosure.

Similar to the embodiment of FIG. 5, an external cellular source 406B can be utilized in the node configuration 302 of FIG. 7, which uses only one (1) 802.11ax chipset 408. The aforementioned second-tier node vendor can utilize such node to support various use cases such as those described further herein (see e.g., FIG. 12).

Figure 8:
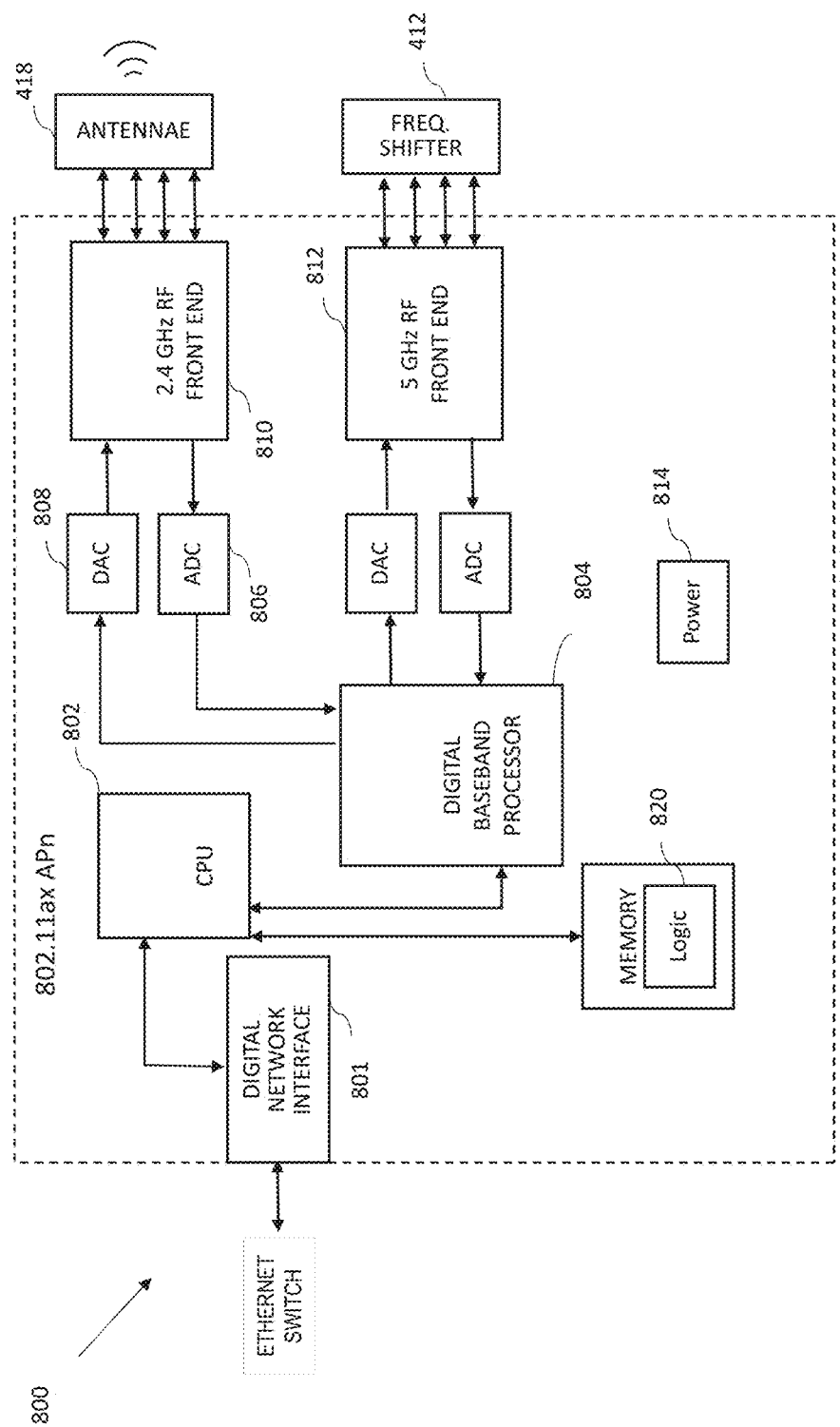
FIG. 8 is a functional block diagram of one embodiment of an IEEE Std. 802.11ax-enabled access device according to the disclosure.

FIG. 8 illustrates one embodiment of an exemplary IEEE Std. 802.11ax chipset used in conjunction with the nodes 302 of FIGS. 4-7. As shown, the chipset 408 includes a digital network interface 801 (e.g., Ethernet or other protocol), a CPU 802, a digital baseband processor 804, DAC 808 and ADC 806 for digital to analog domain (and vice versa, respectively) conversion of the baseband signals, two RF front ends 810, 812 for the 2.4 GHz and 5 GHz bands respectively, one or more antenna elements 418 for the lower band front end 810, and one or more frequency shifters 412 for the upper band front end 812. A power supply module 814 is also included.

In operation, the baseband chipset processes baseband data received via the digital interface 801 for transmission over one of the two transceiver chains (2.4 GHz OTA, or 5 GHz OTC), as well as signals received thereby for transmission upstream (e.g., via SFP connector/optical modulator to the optical domain, as discussed with respect to FIGS. 4-7). In that chipsets of the type shown in FIG. 8 are readily available and effectively commoditized, they have excellent data bandwidth performance, are readily available at comparatively low cost, and are fully featured in terms of support for various protocols and functions, thereby making them highly useful choices for including with the node 302 (and CPE) of the exemplary embodiments of the present disclosure.

Moreover, the presence of the 2.4 GHz band capability enables each node 302 to act as an ad hoc node for e.g., MSO subscribers who happen to be proximate thereto, with no significant added engineering or implementation costs, and using the same form factor of device. For example, a pole-mounted node "pod" may be used in some applications which may also act as "street level free Wi-Fi" for MSO customers (or even others if permitted) within the footprint of the pole pod (whether transiently within the footprint, or permanently there, such as where a business or residence is within 2.4 GHz WLAN range of the pole pod.

Likewise, through simple addition of appropriate cellular antennae, the pod can act as a cellular extender or repeater, which is particularly advantageous in cases where the extant cellular service from an MNO (or unlicensed/quasi-licensed "cellular" offered by the MSO) is poor in that area due to extended range from the closest base station, in dense urban environments where signal propagation may be poor in certain areas, etc.

Exemplary Use Cases

Figure 9:
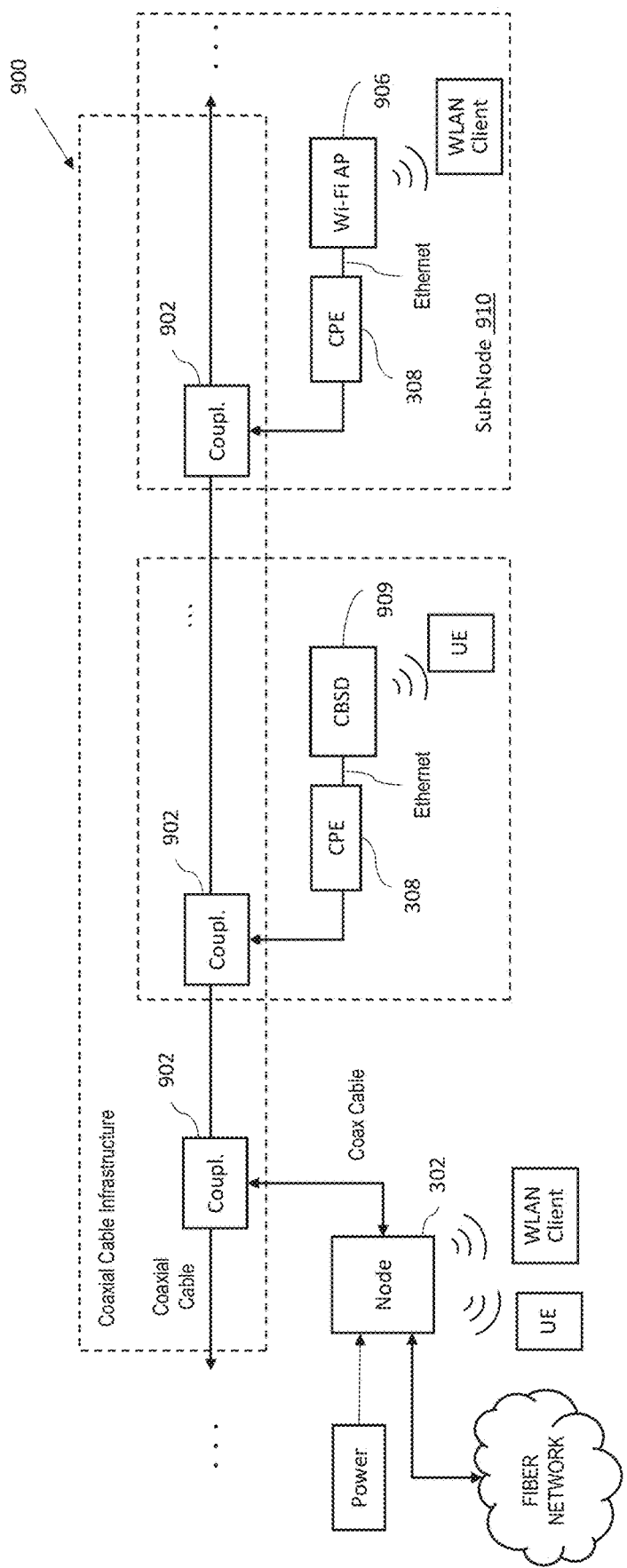
FIG. 9 is a functional block diagram illustrating a first exemplary use case of utilizing the exemplary node apparatus according to the present disclosure.

FIG. 9 is a functional block diagram illustrating an exemplary embodiment of a network architecture 900 for providing small cell service by using the node apparatus of the present disclosure. Exemplary applications of this use case include extant coaxial cable infrastructure such as overhead cable runs (e.g., on telephone poles or similar structures), as well as underground cable runs.

As a brief aside, a small cell is typically a low-powered cellular radio access node that operates in licensed and unlicensed spectrum, e.g., with a range of 10 meters to a few kilometers. The FCC defines small cell equipment further at e.g., https://www.fcc.gov/document/fcc-facilitates-wireless-infrastructure-deployment-5g. As such, exemplary applications of the node apparatus 302 of the present disclosure can utilize relatively low powered devices which operate in unlicensed or quasi-licensed (e.g., CBRS or C-Band) spectrum which provide enhanced coverage for e.g., MSO subscribers.

As shown in the exemplary application of FIG. 9, a first node 302 is disposed between a backhaul network (such as e.g., fiber network shown in FIG. 9) and an existing wireline (e.g., coaxial cable) infrastructure. In one variant, such network architecture can provide an improved data services at an edge of e.g., an access network such as that provided via cellular radio technology like 3GPP 4G/5G by an MNO or even the MSO itself, as long as the existing wireline infrastructure is accessible. Hence, even though user devices disposed at the edge of such network may not be able to receive high-rate data services from the access network itself (due to e.g., lack of cable drops or wireless access nodes such as NodeBs or CBSDs), the architecture 900 of FIG. 9 utilizes the inventive node 302 coupled to an existing coaxial cable infrastructure to provide the high-rate data services enabled by e.g., the 4×4 802.11ax chipset capabilities. For example, once a given node 302 is coupled to the existing coaxial cable infrastructure by a coupler 902, any user devices at a premises with access to the coaxial cable can utilize a CPE 308, which can be coupled to the coaxial cable to receive and send data via e.g., connecting to the CPE itself (e.g., an Ethernet connection) or a connected Wi-Fi AP 906. Likewise, a CPE 308, cable and node 302 can act in effect as a backhaul for MSO small cell devices such as CBRS CBSDs 309 as shown.

Hence, multiple different coupler/CPE "sub-node" equipment 910 can be used to support various types of wireline and wireless services at each individual premises.

It will be appreciated that based on configuration of the node(s) 302: (i) cellular-enabled UE and/or WLAN clients local to the node 302 itself can be serviced, and (ii) premises connected to or tapped off the coaxial cable and having suitable CPE 308 can provide unlicensed/quasi-licensed small-cell functionality and Wi-Fi functionality at end-user premises. Thus, the node(s) 302 can support both incidental or ad hoc users in proximity thereto (e.g., who happen to be walking by or situated near a node on a telephone poll or neighborhood box), as well as a number of end-user premises with CPE 308 and associated WLAN or small-cell wireless transceivers, as shown in FIG. 9.

Figure 10:
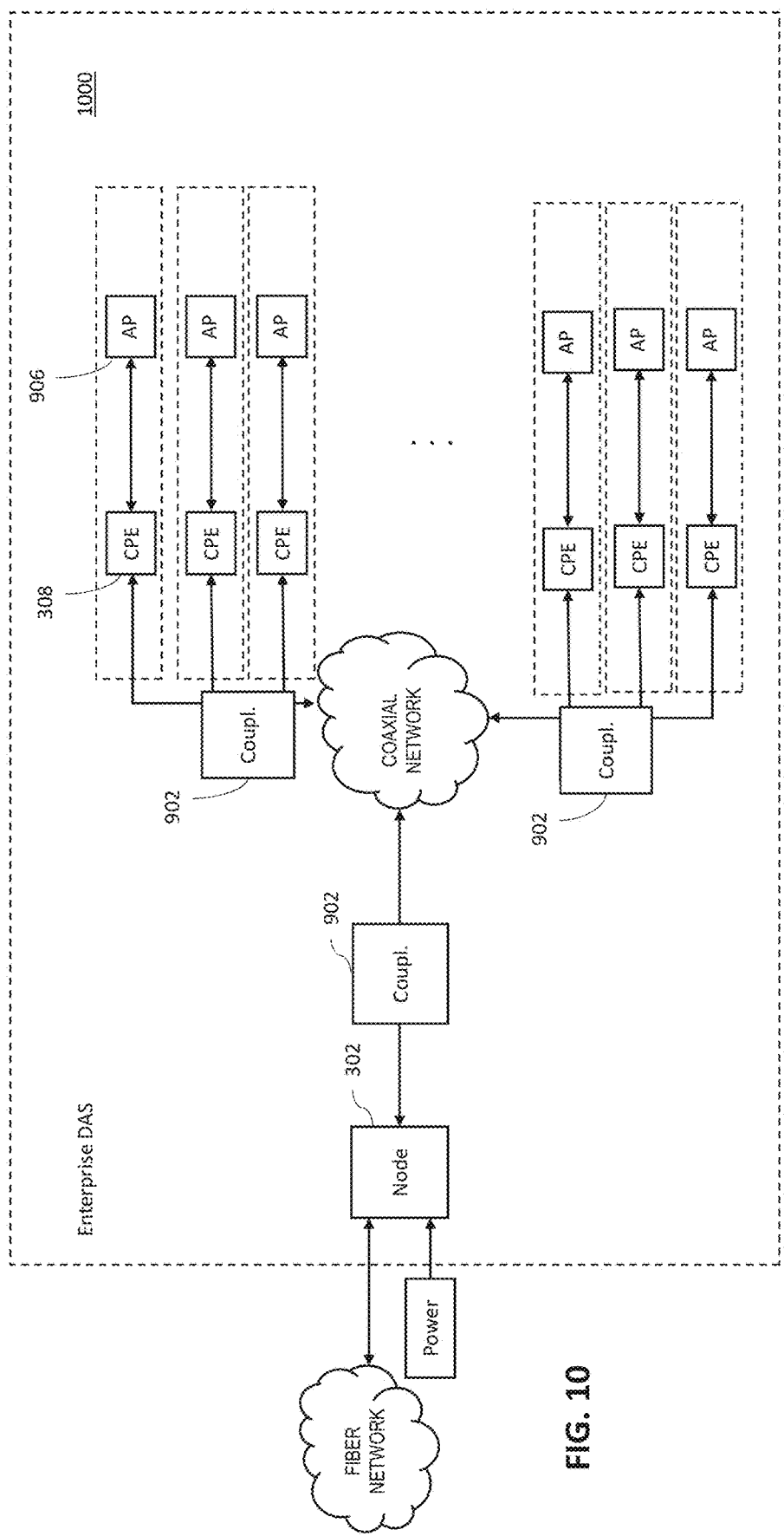
FIG. 10 is a functional block diagram illustrating a second exemplary use case of utilizing the exemplary node apparatus according to the present disclosure.

FIG. 10 is a functional block diagram illustrating another exemplary embodiment of a network architecture 1000, in this scenario for providing a DAS (distributed antenna system) for an enterprise or similar premises (e.g., one with multiple structures, rooms, speces or departments, which may be distributed within a larger campus or area).

As previously described with respect to e.g., FIG. 3B herein, the DAS architecture includes one or more "local" nodes 302 which is/are disposed at the enterprise premises and used to deliver MSO data and signals directly to the enterprise premises and its local (premises) coaxial distribution network, including in some cases without need of any interposed amplifier. For example, the enterprise premises may have an optical fiber drop (e.g., FTTC or FTTH) node 302 proximate thereto or serving the premises, such that the inventive node 302 can be used to directly serve the enterprise premises, such as by being mounted on a utility pole proximate the premises, or in the case where the node 302 serves only the premises, integrated within the premises itself (e.g., in a telecommunications service ingress/egress room or similar). In this configuration, the optical node delivers signals to the 802.11ax node 302, the latter which transforms the signals to the RF domain for delivery on the premises coaxial network of the enterprise (e.g., to different rooms or departments or structures thereof) to individual CPE 308 via one or more couplers 902. To the degree that the node 302 is physically/topologically proximate to the various CPE 308 it serves, the use of an amplifier as in other more distant configurations can be avoided, thereby further reducing cost, complexity and CAPEX.

It should be appreciated that the architecture of the premises network and topology thereof can be literally of any shape or size, and advantageously may be pre-existing such that it can be "repurposed" rather than having to be rewired with e.g., optical fiber or CAT-5/6 cabling. The different areas of the premises are served by the existing coaxial infrastructure, and a multitude of couplers 902 may be used to branch into different areas of the premises (if not present) to allow CPE 308, as well as optional Wi-Fi APs 906 or small cells 909 to be connected to provide the high-rate data services as enabled by the 4×4 802.11ax chipset capabilities of the node 302 (and the CPE 308).

Such architecture would be especially useful in e.g., network edge deployments which do not have good cellular coverage otherwise. For example, such buildings would not require any additional fiber installation or additional cellular towers be placed nearby by an MNO; the node 302 and the CPE 308 can provide the high-rate data wireless and wireline services via utilization of the existing coaxial cable infrastructure.

Figure 11:
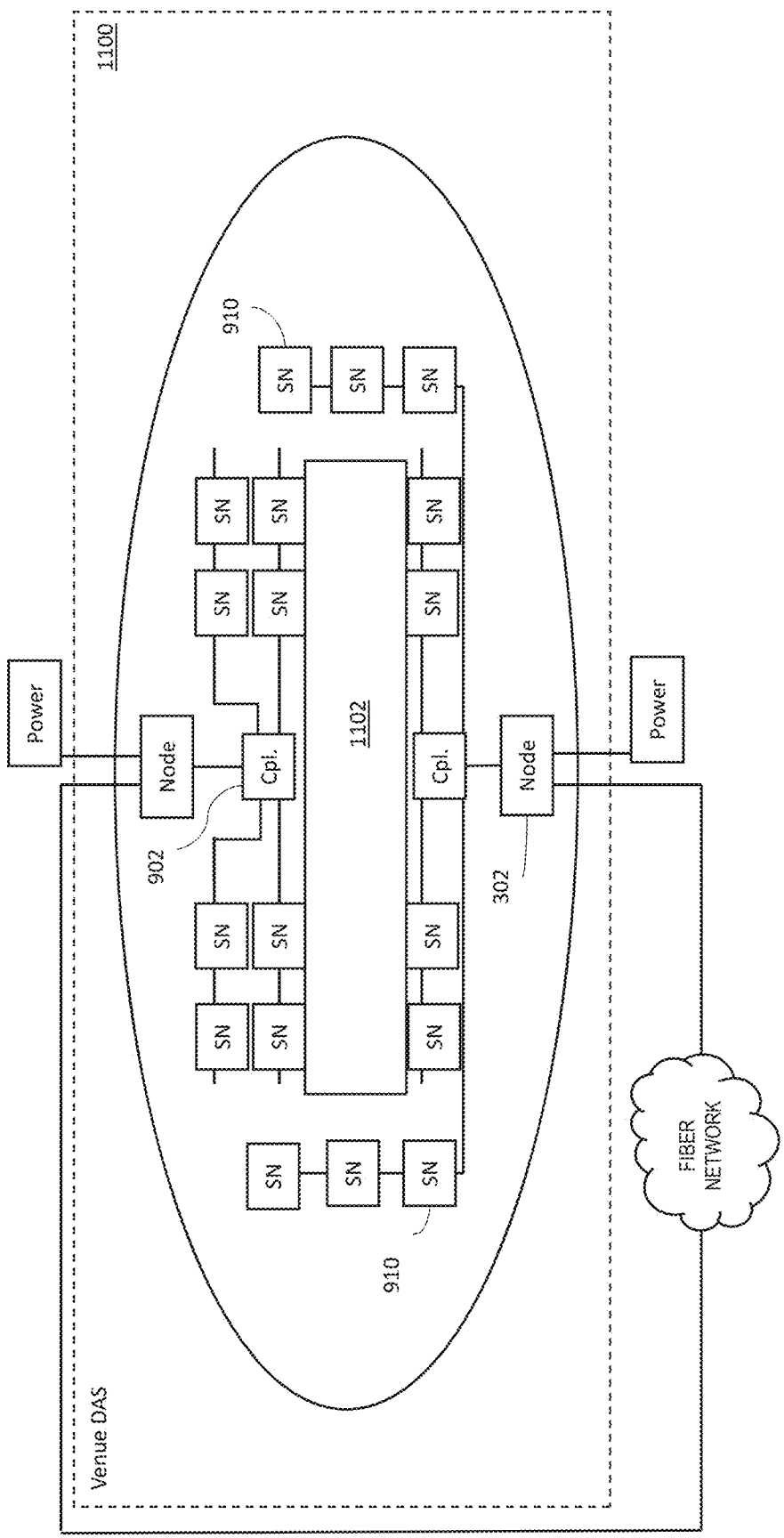
FIG. 11 is a functional block diagram illustrating a third exemplary use case of utilizing the exemplary node apparatus according to the present disclosure.

FIG. 11 is a functional block diagram illustrating another exemplary embodiment of a network architecture 1100 for providing a DAS, in this case for a venue such as a sports stadium, convention center, or other similar application.

Similar to the architecture of FIG. 10, the present embodiment includes one or more "local" nodes 302 disposed at the venue. The venue of FIG. 11 includes an existing or added wireline infrastructure made up of multiple paths branching out or otherwise distributed from the local nodes 302. In one variant, the nodes 302 are coupled onto an existing coaxial cable infrastructure branching into various parts of the venue. A plurality of network sub-nodes 910, each including a coupler 902, CPE 308, and an optional small-cell (e.g., CBSD) or Wi-Fi AP (see FIG. 9) are coupled onto various parts of the existing coaxial cable infrastructure by a plurality of centralized couplers 902 (although the sub-nodes 910 may couple directly to cable, as in the embodiment of FIG. 9). As with previously described embodiments, the local nodes 302 can be used in conjunction with the coaxial infrastructure to provide high-rate data services to user devices disposed at different parts of such venue, such as to ensure adequate wireless coverage of all seating or other areas (which may have very high user density and hence prospective levels of interference), including to account for physical or environmental factors specific to the venue (e.g., "dead" spots due to certain types of materials, added structures, etc. The ability to couple onto the existing or extended coaxial cable of the venue at literally any free location can also aid in ad hoc placements which were not necessarily contemplated at time of the cable installation or venue construction.

In one variant, a fiber drop within the HFC network which runs all the way to the venue may be used as the basis for supporting the local node(s) 302. As such, the nodes can be placed at locations within the venue where such fiber drop(s) come in, including placement of two or more nodes in a common location of the venue (not shown) which each serve respective portions of the extant (or added) cable topology of the venue.

It should be appreciated that the architecture of the venue can also be of any shape or size. The different areas of the venue can be served by the coaxial infrastructure, including any extensions thereof which may be added to ensure more complete coverage consistent with the physical attributes (range, directionality, etc.) of the installed CPE 308 and supported end-user devices such as small cells or WLAN APs. As long as the CPE can couple onto the coaxial infrastructure, the CPE can provide network connection to any user devices that can connect to the CPE (or its daughter devices).

Figure 12:
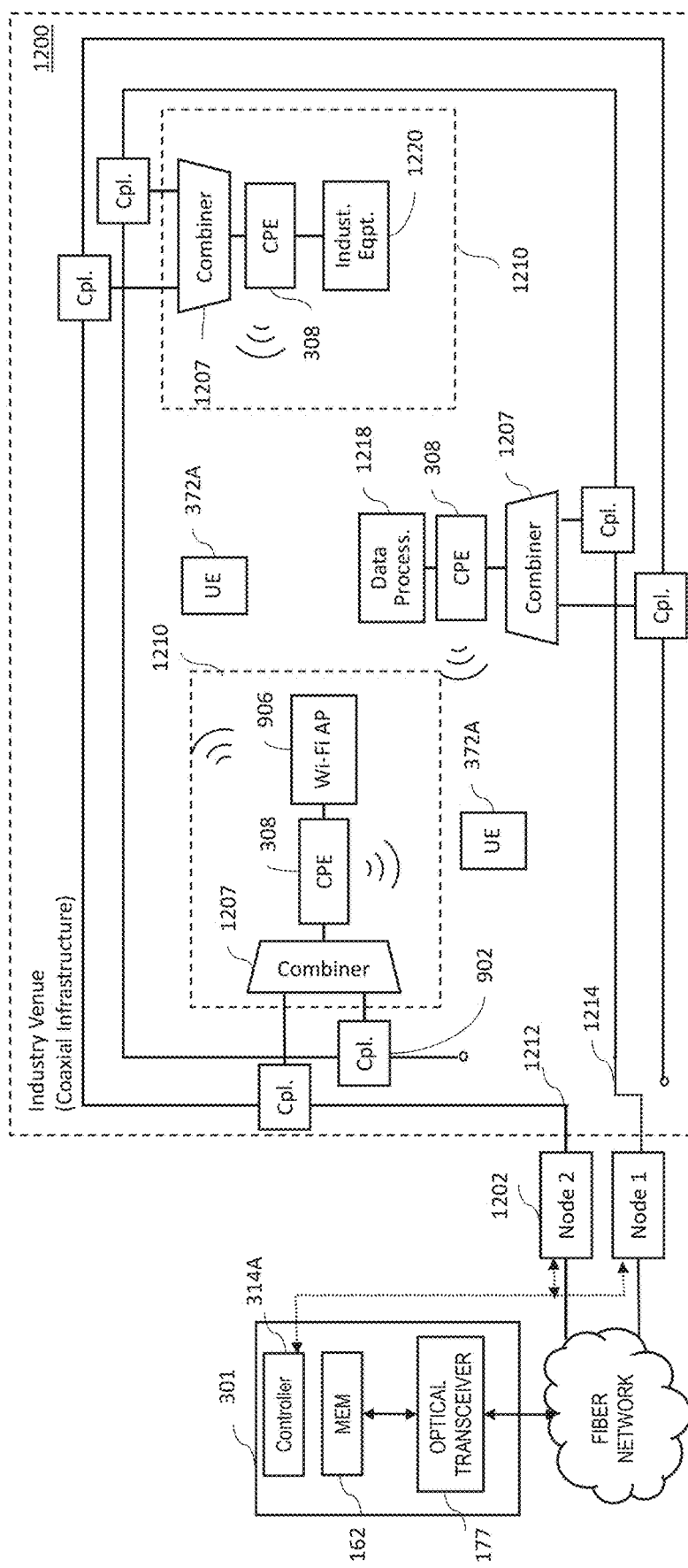
FIG. 12 is a functional block diagram illustrating a fourth exemplary use case of utilizing the exemplary node apparatus according to the present disclosure.

FIG. 12 is a functional block diagram of another exemplary architecture is described. In this architecture 1200, reliability of data services is provided via redundancy. Such redundancy/reliability is useful in e.g., industrial or other critical applications. For instance, for many chemical processes, loss of electrical power or process data can result in significant costs or material losses. Similarly, for certain data-intensive industrial applications (such as cloud services, server farms, distributed storage, etc.), data reliability/redundancy may be a significant or even critical feature. Hence, as used herein, the terms "reliability" and "redundancy" are meant to broadly encompass, without limitation: (i) provision of additional capability over that provided or capable of being provided by a single distribution infrastructure (such as e.g., a single branch of a coaxial cable topology), as well as (ii) provision of backup or fail-over capability to the capacity provided by said single distribution infrastructure.

With the foregoing as a backdrop, the embodiment of the architecture 1200 of FIG. 12 includes a control device 301 in data communication with each of Node 1 and Node 2 1202 of FIG. 12 via fiber network; the control device 301 can for example implement the band allocation plan 220 so as to allocate e.g., half of the aforementioned exemplary 1.6 GHz of bandwidth to Node 1 while allocating the other half to Node 2. In one variant, Node 1 can process one set of data via signaling over ~700 MHz of bandwidth, while Node 2 processes another set of data via signaling over the other ~700 MHz of bandwidth. Then, the processed signals can be distributed to the various CPE 308 at the premises and/or optional Wi-Fi AP 906 (or small cell 909, not shown) after being combined through a combiner 1207, to provide network coverage to user devices such as UE 372A, or factory/automation or data processing equipment 1218, 1220.

As a brief aside, the attenuation associated with any coaxial cable infrastructure is a function of, inter alia, coaxial conductor length. Accordingly, by dividing the data set to be transmitted to various parts of the industry venue shown in FIG. 12, the network architecture 1200 can take advantage of the two (or by extension any number of) paths 1212, 1214 of an existing coaxial infrastructure, by which the signal sent out of Node 1 can reach one part of the infrastructure, and likewise signals sent out of other nodes can reach other parts of the infrastructure (as contrasted with a single long coaxial cable). Through coordination of node and CPE placement, both redundancy and reliability can be achieved by having nodes service different sub-portions of the coaxial cable topology, including variants where signals transmitted from two different nodes are distributed to common CPE (albeit from different cable runs) so as to minimize the amount of attenuation and potential loss of data by sending and combining data as sent over the paths 1212 and 1214. Moreover, if the signals are redundant of one another, the signals distributed to a given CPE 308 can be selectively used in cases where one signal is lost; i.e., the signals may be delivered redundantly to the same node, and the secondary or backup signals used only in the event of the loss of primary signals delivered via another cable segment (e.g., in the even of one branch's node failure, cable cut, etc.)

Exemplary Methods

Figure 13:
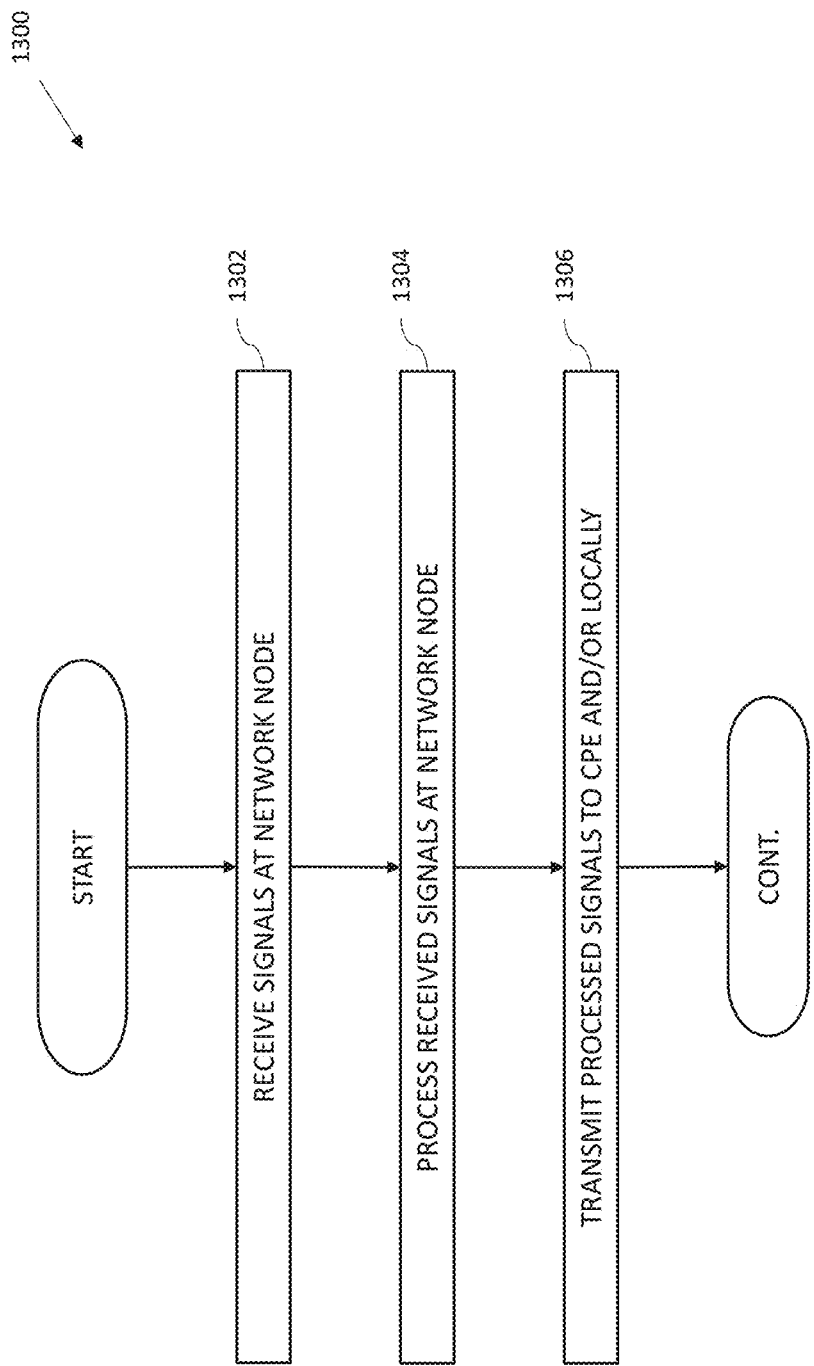
FIG. 13 is a logical flow diagram of an exemplary embodiment of a generalized method for providing high-capacity data services over a content delivery network, according to the present disclosure.

Referring now to FIG. 13, one embodiment of a general methodology for providing high data rate services via one or more node apparatus 302 over a content distribution network (such as via the architectures 300, 320, 340, 360 previously described with respect to FIGS. 3A-3D) is described.

As shown, per step 1302, one or more signals are received at the network node(s) 302. In one variant, the signals are received via an optical interface such as one connected to DWDM ring or the like. Alternatively (or concurrently), a wireless link such as an mmWave system may deliver the signals to the node 302.

Per step 1304, the received signals are processed at the network node(s) 302. In one variant, one or more 802.11ax-based components are utilized to process the received optical domain signal (e.g., via an SFP port of the node 302) to the RF domain. For example, as discussed elsewhere herein, one or more 4×4 802.11ax modules 408 (FIG. 4) can be used to process the signal to e.g., enable an enhanced feature set as supported by the 802.11ax technology ecosystem. The foregoing feature set includes, but is not limited to, e.g., symmetric high-bandwidth data operation and data processing scheduling (e.g., prioritization of real-time data over non-real-time data, QoS prioritization, etc.). Exemplary protocols for the APs are set forth in "P802.11ax—IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN" dated Dec. 6, 2017, which is incorporated herein by reference in its entirety.

In this variant, one or more frequency shifter modules 412 (FIG. 4) are also utilized to down-convert the signal to be transmitted at a frequency appropriate for downstream communications (e.g., from the 5 GHz band signals generated by the 802.11ax AP, to be put on coaxial cable infrastructure at the appropriate portion of the bands shown in the frequency plan 200 of FIG. 2).

Per step 1306, the processed and down-converted signals are transmitted downstream towards the served CPE 308. In one variant, the signal is transmitted downstream via coaxial cable infrastructure. Such transmission via the coaxial cable allows the signal to be propagated via e.g., an extant coaxial cable infrastructure of an MSO, so that the data can travel downstream at a high data rate even though the coaxial cable infrastructure is used.

It will be appreciated that generally speaking, the methodology for UL/US transmissions is analogous to that for DS/DL, yet inverted.

Moreover, per step 1306, the received signals from the optical source (and 4G/5G source—see e.g., FIG. 4) can also be distributed locally via the WLAN and 3GPP (4G/5G) antennae of the node 302, such as to provide local WLAN and cellular service to MSO users who are proximate to the node 302 (as contrasted from downstream CPE which may not be in wireless range of the node 302). Such signals can also be sent downstream in the assigned cellular bands at lower end of the spectrum 220 for distribution via the CPE 308 at the user/customer premises.

Figure 14:
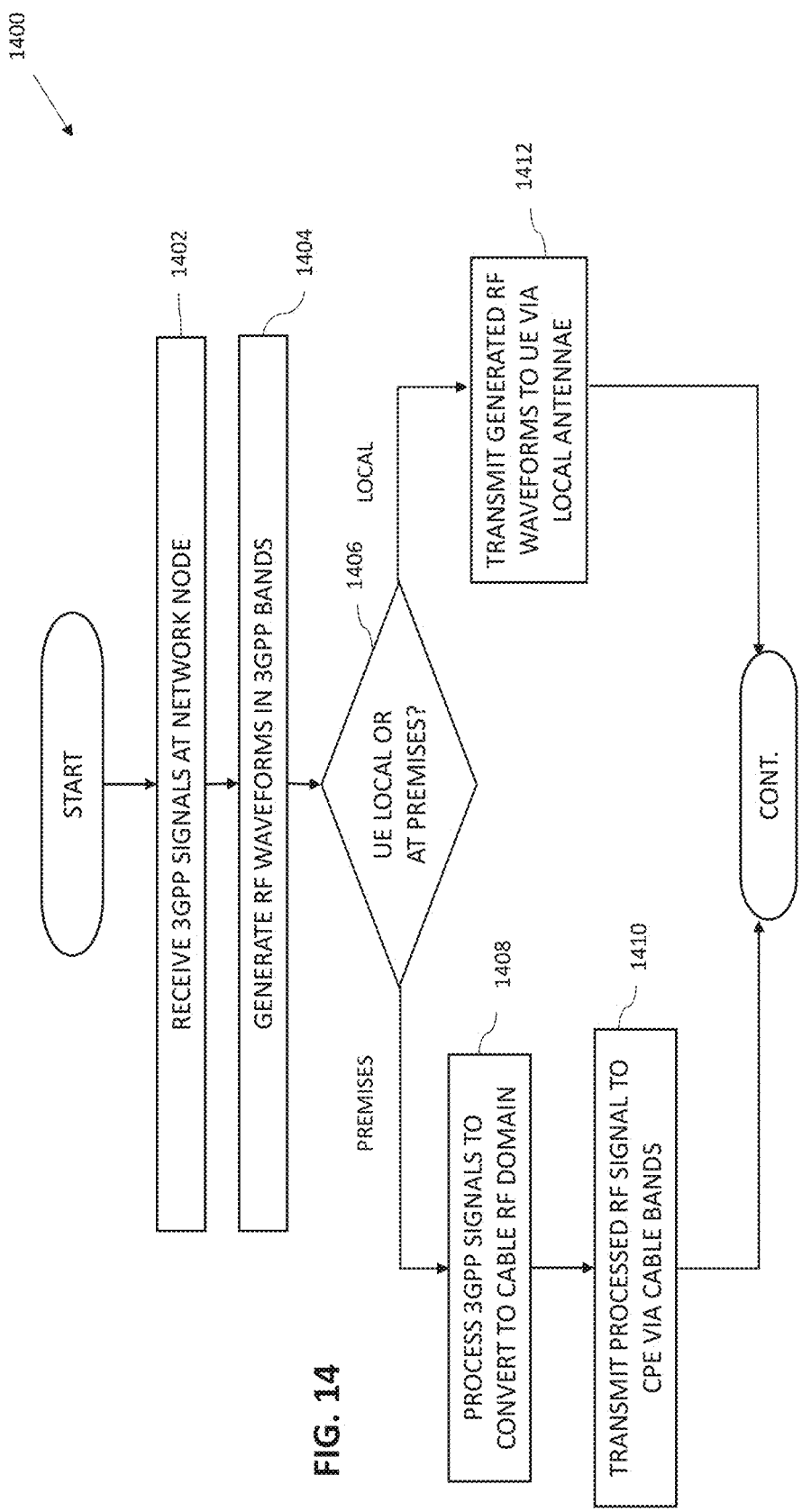
FIG. 14 is a logical flow diagram representing one variant of the generalized method of FIG. 13, according to the present disclosure.

FIG. 14 illustrates one exemplary implementation of the general method of FIG. 13, in this instance to take received 3GPP source data and distribute it locally or remotely via 3GPP and cable band frequencies, respectively. In this scenario, the 3GPP signals bypass the 802.11ax chipset, and are processed entirely by the 4G/5G chipset (and subsequent frequency shift logic for signals distributed downstream on the cable).

As shown, the method 1400 of FIG. 14 includes first receiving e.g., 3GPP signals per step 1402. For instance, the signals may carry data destined for a 3GPP UE user served by either the node 302 directly, or by a downstream CPE 308 with associated 3GPP capability (either indigenously, or by way of e.g., a connected femto-cell or the like). Depending on how received (e.g., via the optical/SFP interface or directly as electrical domain data at the 3GPP chipset), conversion to the electrical domain may be required (not shown).

Next, per step 1404, the 3GPP source 406A, 406B (see FIGS. 4 and 5) is used to generate 3GPP compliant waveforms for transmission over the local antennae of the node 302. For instance, the source may comprise a 4G or 5G chipset configured to convert the baseband data extracted from received optical signals and passed to the chipset that are destined for a node-local cellular user to 4G or 5G (e.g., unlicensed NR-U) frequency bands for transmission over the antennae. Depending on the chipset used and relevant standards, such RF bands may be anywhere from e.g., 1.6 GHz up to mmWave frequencies (e.g., 40 GHz or above). In one variant, opto-electric converters/modulators or similar devices of the type known in the art may be used for the domain transformation.

Per steps 1406 and 1408, if the UE is communicative with a downstream CPE 308 or associated device, the electrical domain signals are converted to cable RF band frequencies (e.g., 1.6 GHz or less) for transmission to downstream CPE, and per step 1410, the cable RF signals are transmitted downstream on the coaxial cable to one or more CPE 308.

Figure 14A:
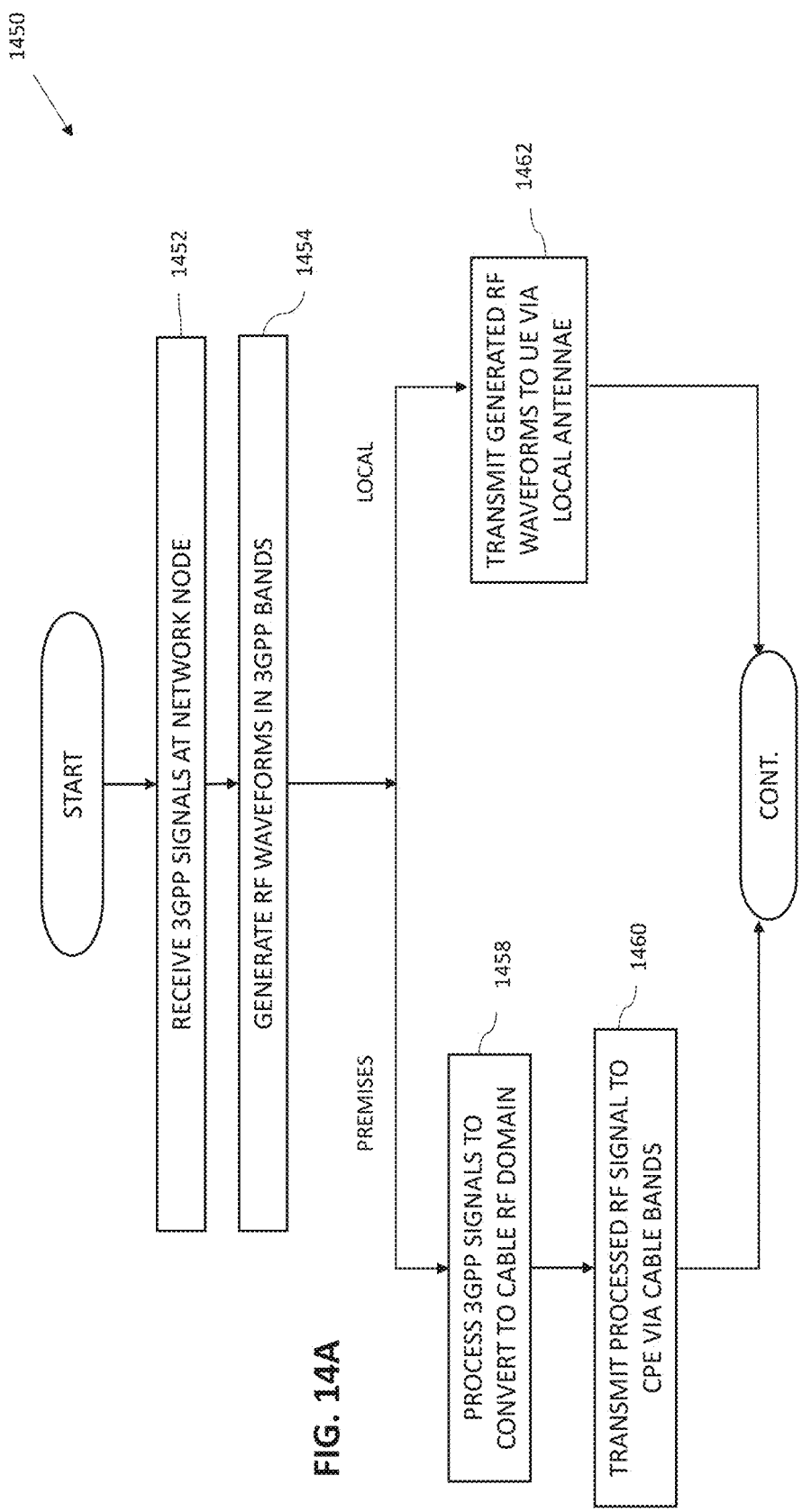
FIG. 14A is a logical flow diagram representing one alternate implementation of the method of FIG. 14, wherein signals are "broadcast" both locally at the node and transmitted downstream for premises consumption.

It will be appreciated that the present disclosure contemplates use of either (i) active or passive determination of UE or client location as part of step 1406 of FIG. 14, or (ii) no UE location determination (FIG. 14A discussed below). That is, UE location may be determined, if desired, based on e.g., an association with or connection to (or attempted association or connection) a given node or CPE (or associated small cell), such as according to extant 3GPP RACH protocols, or authentication protocols. Once such association or connection is detected, the given UE is presumed to be located in proximity to that node or CPE/small cell, and signals received from or transmitted to the UE via the appropriate node or CPE/cell will occur (as opposed to via the other device). Accordingly, in one such scenario, the node 302 may detect a local UE via signals transacted over the local antenna/ports, and is configured to obviate further transmission of those signals downstream so as to conserve downstream bandwidth on the cable (since there will be no UE at the CPE/small cell to utilize such downstream signals). Conversely, data signals transacted by the cellular source chipset destined for a downstream CPE/small cell where the UE is located may obviate transmission of signals over the local antennae of the node 302.

Alternatively, if per step 1406 the UE is communicative with the local node 302, then per step 1412, the converted signals in the 3GPP RF domain are transmitted via the 3GPP antennas 419 of the node to the local UE. It will be noted that the foregoing implementation can be used to provide a high-capacity cellular data service for e.g., 3GPP-capable user equipment disposed proximate to the node (wherever that may be positioned within the network topology) as well as those disposed proximate to a CPE (e.g. at the distribution network edge), the CPE 308 distributing the 3GPP RF waveforms either by indigenous 3GPP chipset or attached small-cell or femto-cell. If the node and CPE are geographically local, the node and/or CPE can also be tuned to co-exist (e.g., such that each provides complementary coverage for the other without undue overlap or interference, and such that the UE can affirmatively associate with one or the other so as to avoid "dither" between being serviced by the node and servicing by the CPE/small-cell).

However, as noted above, the signals may be "broadcast" to both locations (see FIG. 14A). This approach also underscores another advantageous aspect of the exemplary node configuration and delivery model of the present disclosure; i.e., the signal being radiated at the node (ostensibly to any nearby UE) will be a different frequency to that which is being transmitted down the coaxial infrastructure by virtue of the frequency shifting. A single UE is not going to receive the transmission from the node (which will typically be outdoors), and the signal sent down the coaxial infrastructure and subsequently up-converted is geographically removed from the node, and is generally transmitted indoors.

FIG. 14A illustrates one exemplary implementation of the method of FIG. 14, in this instance to take received 3GPP source data and distribute it both locally and remotely via 3GPP and cable band frequencies, respectively. As shown, the method 1450 of FIG. 14A includes first receiving e.g., 3GPP signals per step 1452.

Next, per step 1454, the 3GPP source 406A, 406B (see FIGS. 4 and 5) is used to generate 3GPP compliant waveforms for transmission over the local antennae of the node 302, as previously described.

Per step 1458, the electrical domain signals are converted to cable RF band frequencies (e.g., 1.6 GHz or less) for transmission to downstream CPE, and per step 1460, the cable RF signals are transmitted downstream on the coaxial cable to one or more CPE 308.

Additionally, per step 1462, the converted signals in the 3GPP RF domain are transmitted via the 3GPP antennas 419 of the node to the local UE. As with FIG. 14, the foregoing implementation can be used to provide a high-capacity cellular data service for e.g., 3GPP-capable user equipment disposed proximate to the node (wherever that may be positioned within the network topology) as well as those disposed proximate to a CPE (e.g. at the distribution network edge), the CPE 308 distributing the 3GPP RF waveforms either by indigenous 3GPP chipset or attached small-cell or femto-cell.

Figure 15:
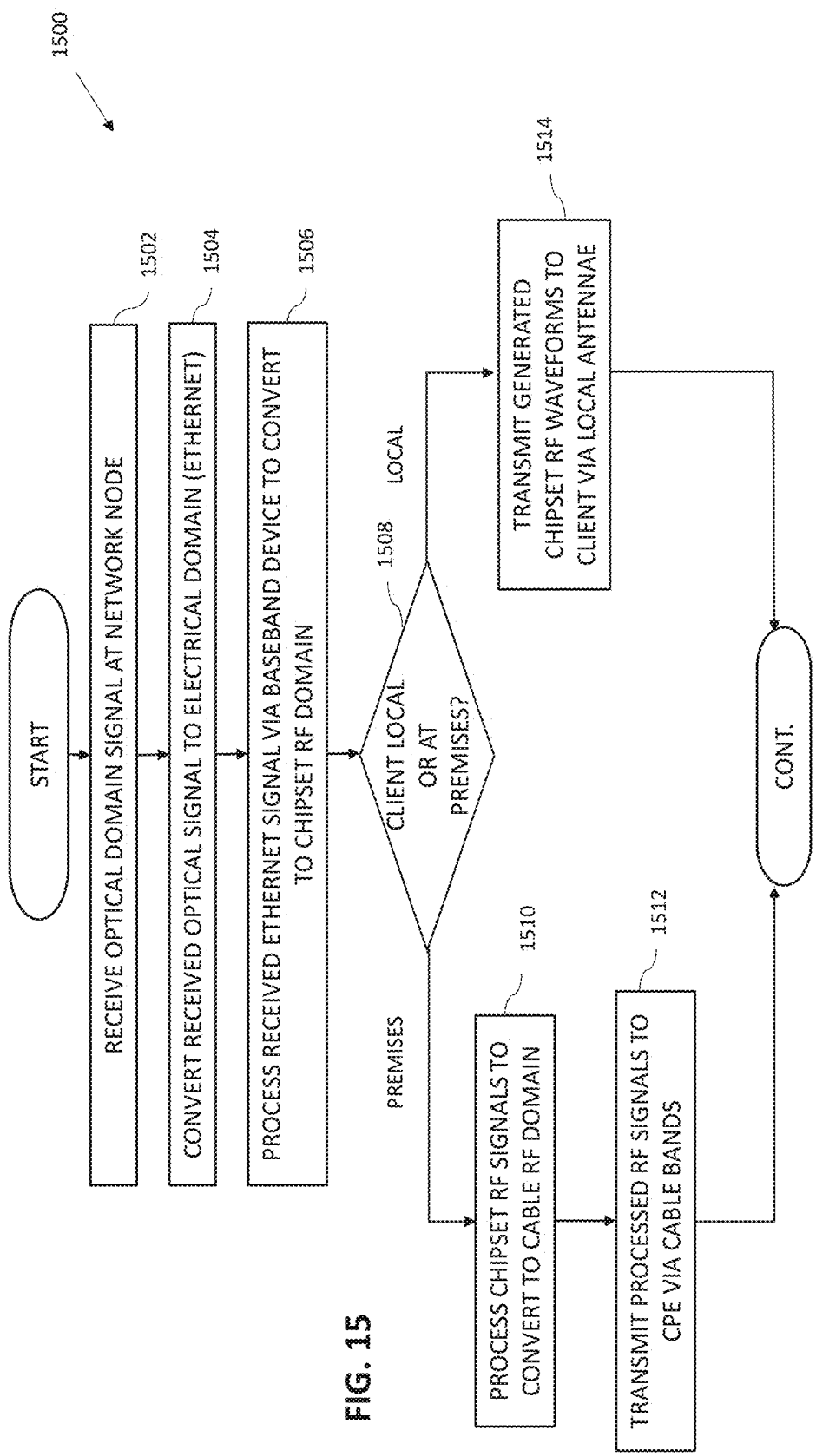
FIG. 15 is a logical flow diagram representing another variant of the generalized method of FIG. 13, according to the present disclosure.

FIG. 15 illustrates another exemplary implementation of the general method of FIG. 13. In this case, received signals (which may be destined for e.g., for WLAN-enabled user mobile or premises devices such as PCs or tablets, or smart TVs) are processed by the 802.11ax chipset and distributed locally or downstream to the 802.11ax-enabled CPE 308 for distribution at the premises.

As shown, the method 1500 of FIG. 15 includes first receiving an optical domain signal per step 1502.

At step 1504, the received signal is converted from the optical domain to electrical (e.g., Ethernet), such as by an Ethernet MAC chipset within the node 302.

Then, the converted signal is processed by an 802.11 AP module per step 1506. The processing by the 802.11 AP module enables inter alia, implementation of one or more enhanced features available via 802.11 Wi-Fi protocols. The 802.11ax chipset outputs waveforms in the chipset's RF domain (e.g., 5 GHz band WLAN waveforms according to 802.11ax protocols).

Per steps 1508 and 1514, if destined for a local client, the chipset RF domain signals are transmitted over the local WLAN antennae of the node 302, such as to nearby incidental WLAN users. To this end, an MSO may position its nodes at certain prescribed locations relative to higher densities of users (e.g., within 100 feet or so of areas of high user traffic or participation, such as at a train station, shopping mall, etc.), such that these incidental users may be advantageously exposed to the MSO's WLAN services (e.g., "free MSO Wi-Fi").

Moreover, since different ports on the WLAN chipset are used for local transmission, the chipset itself can differentiate between local and downstream (CPE-based) users for purposes of differentiating local versus premises delivery, such as when implementing the logic of method step 1508.

Alternatively, if a CPE-based user device is being served, then per step 1510, the processed signal from step 1506 is down-converted to an appropriate cable RF band (e.g., per frequency plan 200 of FIG. 2), and per step 1512, the down-converted processed signal is transmitted to the CPE of the served premises for use by the user's equipment (e.g., to supply WLAN service to the user device at the premises).

It will be appreciated that once the location of the UE or client of FIG. 14 or 15 respectively is established, the US transmission path is also established similar to the methodologies 1400, 1500 described above, and hence two-way communication between the UE/client and a distant entity (e.g., another UE or internetwork server) is used, with frequency/domain conversion in effect operating in reverse from that described above. For instance, a distant WLAN client at a premises device will interface with the CPE 308 using 802.11ax waveforms and the local 802.11ax chipset, and the chipset will convert the received waveforms to baseband data for subsequent frequency shifting, diplexing, etc. for transmission upstream to the node 302 at cable domain frequencies (e.g., less than 1.6 GHz).

Figure 15A:
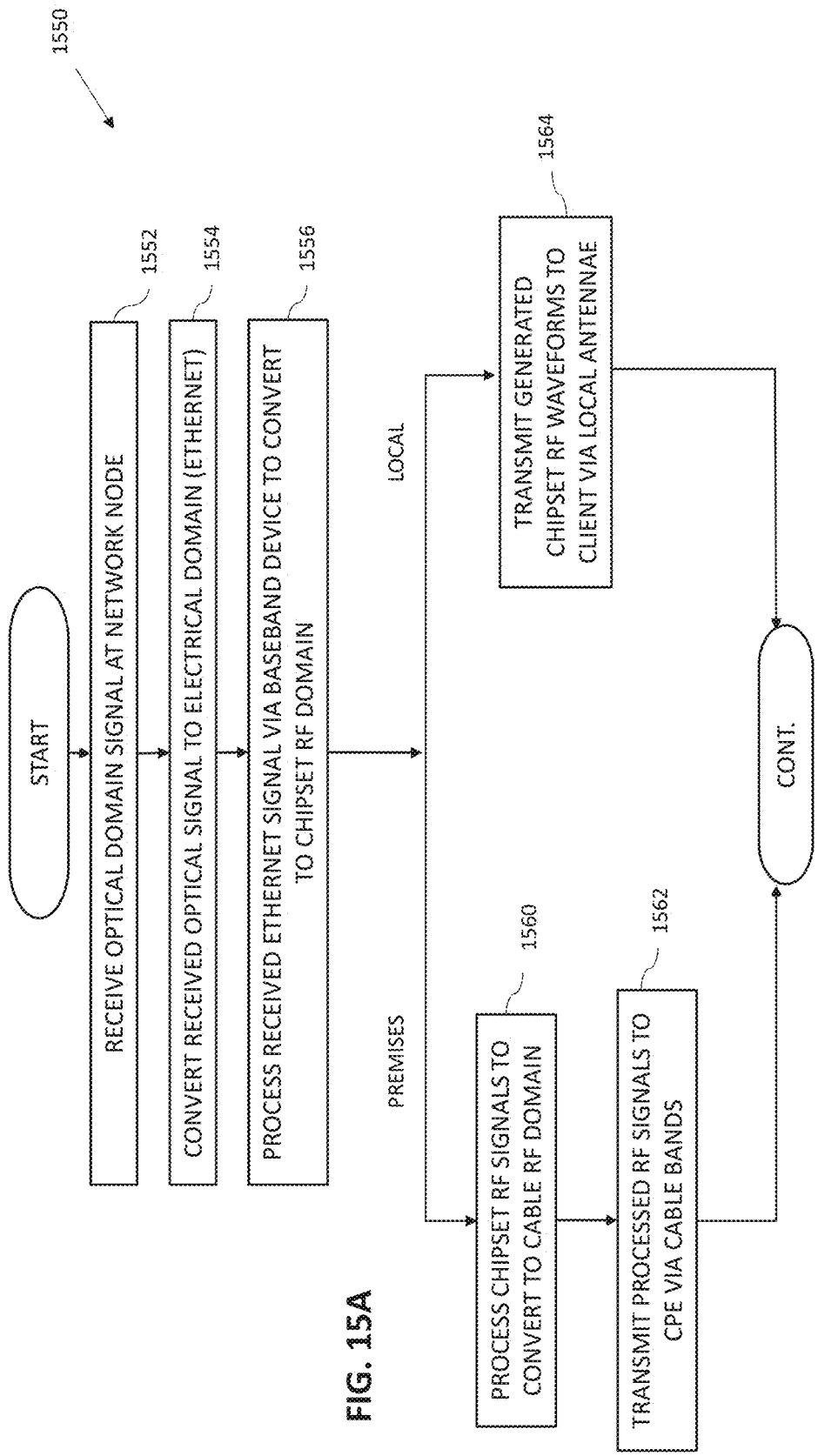
FIG. 15A is a logical flow diagram representing one alternate implementation of the method of FIG. 15, wherein signals are "broadcast" both locally at the node and transmitted downstream for premises consumption.

FIG. 15A illustrates an exemplary implementation of the general method of FIG. 15. In this case, received signals (which may be destined for e.g., for WLAN-enabled user mobile or premises devices such as PCs or tablets, or smart TVs) are processed by the 802.11ax chipset and distributed locally as well as downstream to the 802.11ax-enabled CPE 308 for distribution at the premises.

As shown, the method 1550 of FIG. 15A includes first receiving an optical domain signal per step 1552.

At step 1554, the received signal is converted from the optical domain to electrical (e.g., Ethernet), such as by an Ethernet MAC chipset within the node 302.

Then, the converted signal is processed by an 802.11 AP module per step 1556. The processing by the 802.11 AP module enables inter alia, implementation of one or more enhanced features available via 802.11 Wi-Fi protocols. The 802.11ax chipset outputs waveforms in the chipset's RF domain (e.g., 5 GHz band WLAN waveforms according to 802.11ax protocols).

Per step 1564, the chipset RF domain signals are transmitted over the local WLAN antennae of the node 302, such as to nearby incidental WLAN users.

Additionally, per step 1560, the processed signal from step 1556 is down-converted to an appropriate cable RF band (e.g., per frequency plan 200 of FIG. 2), and per step 1562, the down-converted processed signal is transmitted to the CPE of the served premises for use by the user's equipment (e.g., to supply WLAN service to the user device at the premises).

Figure 16:
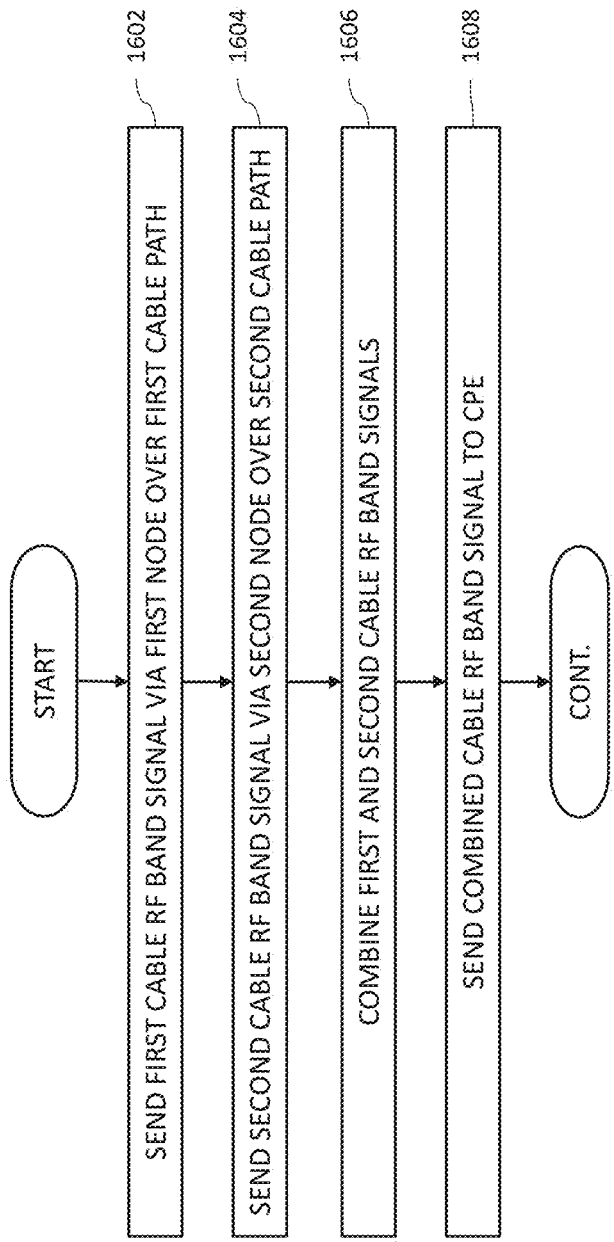
FIG. 16 is a logical flow diagram representing a first embodiment of a generalized method for providing redundancy of data service over a content delivery network, according to the present disclosure.

FIG. 16 is a logical flow diagram representing a first embodiment of a generalized method for providing redundancy of data service over a content delivery network, according to the present disclosure. For instance, in the context of FIG. 12, the methodology 1600 can be used to provide redundancy over such infrastructure at e.g., a venue, enterprise, industrial facility, or other such application.

As shown, per step 1602, a first cable RF band signal is sent from a first node over a first cable path. For instance, the first signal may occupy a first frequency band of the frequency plan 220 of FIG. 2A or 2B.

Per step 1604, a second cable RF band signal is sent from a second node over a second cable path. In one variant, the second cable RF band signals include signals of a different frequency band (e.g., as shown in frequency plan 220 such that the first and second signals do not overlap in frequency).

In one implementation, the two cable RF band signals (transmitted over two different cable paths of the extant coaxial cable infrastructure) are received at a common combiner 1207 via a plurality of couplers 902 (e.g., as shown in FIG. 12).

Per step 1606, the two cable RF band signals are then combined at the signal combiner 1207. Thereafter, the combined signal is transmitted to the CPE 308 per step 1608 for transmission to user equipment.

In the case where the first and second signals occupy different frequency bands, the combination may be as simple as use of an RF combiner/diplexer arrangement, such that the CPE 308 is presented (in the DS) with signals of both bands.

Alternatively, if there is some (or complete) overlap in the signals, such as where the total available bandwidth on the cable is restricted, or for other purposes, the signals may be multiplexed in time, such as according to a TDD type approach. Yet other multiple access type techniques may be used as well, as will be appreciated by those of ordinary skill given the present disclosure.

Figure 17:
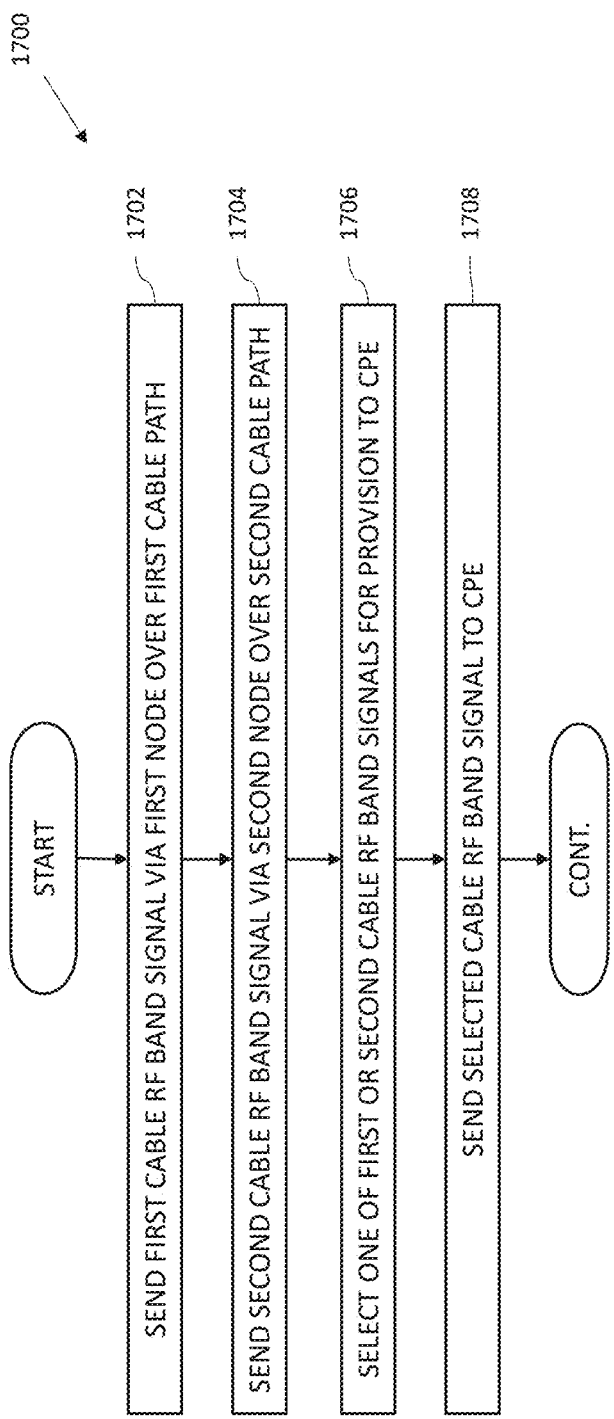
FIG. 17 is a logical flow diagram representing a second embodiment of a generalized method for providing redundancy of data service over a content delivery network, according to the present disclosure.

FIG. 17 is a logical flow diagram representing a second embodiment of a generalized method for providing redundancy of data service over a content delivery network, according to the present disclosure. For instance, in the context of FIG. 12, the methodology 1700 can be used to provide redundancy over such infrastructure at e.g., a venue, enterprise, industrial facility, or other such application.

As shown, per step 1702, a first cable RF band signal is sent from a first node over a first cable path. For instance, the first signal may occupy a first frequency band of the frequency plan 220 of FIG. 2A, or alternatively may occupy all available bands (e.g., first and second bands 226 and 230 or portions thereof), so as to maximize available utilization of the cable medium.

Per step 1704, a second cable RF band signal may be sent from a second node over a second cable path. In one variant, the second cable RF band signals include signals of a different frequency band (e.g., as shown in frequency plan 220 such that the first and second signals do not overlap in frequency). In another variant, the signals occupy the same band (or bands) as the first signals, and are sent only in the event that e.g., the first node becomes inoperative.

In one implementation, the two cable RF band signals (transmitted over two different cable paths of the extant coaxial cable infrastructure) are received at a common combiner 1207 via a plurality of couplers 902 (e.g., as shown in FIG. 12) of a sub-node 1210, and each cable/band can be used to provide bandwidth to users (e.g., WLAN clients) proximate to each sub-node 910.

Per step 1706, the two cable RF band signals are then combined at the signal combiner 1207. Thereafter, the combined signal is transmitted to the CPE 308 per step 1708 for transmission to user equipment.

In the event that one node 1202 fails, the other node and its sub-nodes 1210 with respective CPE can provide redundant coverage to the various locations of the premises, albeit with e.g., half the bandwidth otherwise previously available with both nodes/cables operative. For instance, in one such scenario, sub-nodes are allocated to the same frequency bands as they would be otherwise with both nodes/cables operational, yet at basically half the bandwidth availability. In such instance, the signals need not be combined at the combiner 1207 since only one "loop" is operative.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Node apparatus comprising:
    a first port for interfacing with a first portion of a network topology using at least a first type of network medium for data transmission;
    a second port for interfacing with a second portion of the network topology using at least a second type of network medium for data transmission;
    first network interface logic in communication with the first port;
    first RF (radio frequency) integrated circuit (IC) apparatus in data communication with the first network interface logic, the first RF IC apparatus configured to at least generate first RF waveforms within a first sub-band of a first prescribed frequency band;
    frequency shifter apparatus configured to shift the first RF waveforms within the first prescribed frequency band to a frequency lower than the first prescribed frequency band; and
    second RF IC apparatus in data communication with the first network interface logic, the second RF IC apparatus configured to at least generate second RF waveforms within a second sub-band of the first prescribed frequency band;
    wherein the first RF IC apparatus is configured to generate at least part of the first RF waveforms for output via at least two first spatial diversity ports, and the second RF IC apparatus is configured to generate at least part of the second RF waveforms for output via at least two second spatial diversity ports; and
    wherein the first RF IC apparatus and the second RF IC apparatus each comprise at least one IEEE-Std. (Institute of Electrical and Electronics Engineers standard) 802.11ax compliant IC or chipset configured to generate at least the part of the first RF waveforms within the first sub-band of the first prescribed frequency band, and the second RF waveforms within the second sub-band of the first prescribed frequency band, respectively.

2. The node apparatus of claim 1, wherein the first portion of the network topology comprises a fiber-optic distribution portion of the network topology, and the second portion comprises a coaxial cable portion of the network topology.

3. The node apparatus of claim 2, wherein the network topology comprises a hybrid fiber coaxial (HFC) cable television network topology operated by a multiple systems operator (MSO).

4. The node apparatus of claim 1, wherein the first and second sub-bands each comprise frequency band below 1.6 GHz, said frequency bands below 1.6 GHz suitable for transmission over a coaxial cable portion of the network topology, the coaxial cable portion comprising the second portion of the network topology.

5. The node apparatus of claim 1, further comprising an IC or chipset configured to support at least one of 3GPP (Third Generation Partnership Project) Long Term Evolution (LTE) or 3GPP 5G NR (New Radio) protocols.

6. The node apparatus of claim 5, wherein the IC or chipset configured to support at least one of 3GPP (Third Generation Partnership Project) Long Term Evolution (LTE) or 3GPP 5G NR (New Radio) protocols is configured to generate RF waveforms within an unlicensed or quasi-licensed spectrum band selected from the group consisting of: (i) NR-U bands, (ii) CBRS bands, and (iii)C-Bands.

7. The node apparatus of claim 6, wherein the RF waveforms within the unlicensed or quasi-licensed spectrum band selected from the group consisting of: (i) NR-U bands, (ii) CBRS bands, and (iii)C-Bands are coupled to the second port via a signal path comprising at least a second frequency shifter apparatus and amplification logic; and
wherein the second frequency shifter apparatus is configured to shift the RF waveforms within the unlicensed or quasi-licensed spectrum band selected from the group consisting of: (i) NR-U bands, (ii) CBRS bands, and (iii)C-Bands to a third sub-band within the first prescribed frequency band.

8. The node apparatus of claim 1, further comprising an Industrial Scientific Medical (ISM) transceiver configured to encode data identifying the node apparatus to enable control and fault detection of a computerized premises apparatus by an operator of the network topology.

9. The node apparatus of claim 1, wherein each of the first sub-band and the second sub-band are configured for symmetric operation, thereby having upstream (US) and downstream (DS) capability.

10. A method of operating a node apparatus of a network infrastructure to provide broadband data services, the method comprising:
receiving, via a first portion of the network infrastructure and using at least a first type of network medium for data transmission, first signals;
providing, via first network interface logic, at least a first portion of the first signals to a first RF (radio frequency) integrated circuit (IC) apparatus of the node apparatus;
providing via the first network interface logic, at least a second portion of the first signals to a second RF IC apparatus;
using the first RF IC apparatus of the node apparatus for at least generating RF waveforms within a first sub-band of a prescribed frequency band via at least two first spatial diversity ports;
using the second RF IC apparatus of the node apparatus for at least generating RF waveforms within a second sub-band of the prescribed frequency band via at least two second spatial diversity ports;
using a first frequency shifter apparatus of the node apparatus to shift the RF waveforms within the first and second sub-bands to at least one frequency lower than the prescribed frequency band; and
providing the shifted RF waveforms to a second portion of the network infrastructure using at least a second type of network medium for data transmission;
wherein at least one of (i) the using the first RF IC apparatus for at least the generating of the RF waveforms within the first sub-band of the prescribed frequency band via the at least two first spatial diversity ports, or (ii) using the second RF IC apparatus for at least the generating of the RF waveforms within the second sub-band of the prescribed frequency band via the at least two second spatial diversity ports, comprises using at least one IEEE-Std. (Institute of Electrical and Electronics Engineers standard) 802.11ax compliant IC or chipset for generating at least the part of the RF waveforms within the first sub-band or second sub-band, respectively.

11. The method of claim 10, wherein the first portion of the network infrastructure comprises a fiber-optic distribution portion of the network infrastructure, and the second portion comprises a coaxial cable portion of the network infrastructure.

12. The method of claim 11, wherein the network infrastructure comprises a hybrid fiber coaxial (HFC) cable television network topology operated by a multiple systems operator (MSO).

13. The method of claim 10, wherein the generating of the RF waveforms within the first sub-band comprises generating the RF waveforms with the first sub-band such that they are not overlapping with the RF waveforms of the second sub-band.

14. The method of claim 10, wherein the generating of the first and second sub-bands each comprise generating within respective frequency bands below 1.6 GHz, said frequency bands below 1.6 GHz suitable for transmission over a coaxial cable portion of the network infrastructure, the coaxial cable portion comprising the second portion of the network infrastructure.

15. The method of claim 10, wherein:
the node apparatus further comprise an IC or chipset configured to support at least one of 3GPP (Third Generation Partnership Project) Long Term Evolution (LTE) or 3GPP 5G NR (New Radio) protocols; and
the method further comprises generating RF waveforms within an unlicensed or quasi-licensed spectrum band selected from the group consisting of: (i) NR-U bands, (ii) CBRS bands, and (iii)C-Bands using at least the IC or chipset configured to support at least one of 3GPP LTE or 3GPP 5G NR protocols.

16. A method of operating a computerized apparatus within a network infrastructure, the computerized apparatus comprising (i) a first data interface and a second data interface configured for data transmission with respective first and second portions of the network infrastructure, the first portion of the network infrastructure comprising a fiber-optic distribution portion of the network infrastructure, at least a portion of the second portion of the network infrastructure comprising a coaxial cable portion of the network infrastructure, (ii) an IEEE (Institute of Electrical and Electronics Engineers) Std. 802.11ax-compliant chipset in data communication with the first data interface, and (iii) at least one frequency shifter, the method comprising:
receiving, at the IEEE 802.11ax-compliant chipset and via the first data interface and via the fiber-optic distribution portion of the network infrastructure, first signals;

processing the received first signals to generate 802.11ax-compliant waveforms within a first frequency band via at least two spatial diversity ports associated with the IEEE 802.11ax-compliant chipset; and down-converting a frequency associated with the 802.11ax-compliant waveforms from the first frequency band to a frequency within a second frequency band, the second frequency band adapted for downstream transmission to the coaxial cable portion of the network infrastructure via the second data interface.

17. The method of claim 16, wherein:
the network infrastructure comprises a hybrid fiber coaxial (HFC) cable television network topology operated by a multiple systems operator (MSO); and
the operating of the computerized apparatus within the network infrastructure comprises operating by the MSO a node apparatus disposed at least partly between the first portion and the second portion.

18. The method of claim 16, wherein:
the processing of the received first signals to generate the 802.11ax-compliant waveforms within the first frequency band via the at least two spatial diversity ports associated with the IEEE 802.11ax-compliant chipset comprises processing the received first signals to generate 802.11ax-compliant waveforms within a first sub-band of the first frequency band; and
the method further comprises using a second 802.11ax-compliant chipset in data communication with the first data interface for at least generating 802.11ax-compliant waveforms within a second sub-band of the first frequency band via at least two second spatial diversity ports; and
the first sub-band and the second sub-band are not overlapping with one another in frequency.

19. The method of claim 18, wherein the generating of the 802.11ax-compliant waveforms within the first and second sub-bands each comprise generating within respective frequency bands below 1.6 GHz, said frequency bands below 1.6 GHz suitable for transmission over the coaxial cable portion of the network infrastructure.

20. The method of claim 16, wherein:
the computerized apparatus further comprise at least one IC configured to support at least one of 3GPP (Third Generation Partnership Project) Long Term Evolution (LTE) or 3GPP 5G NR (New Radio) protocols; and
the method further comprises:
generating RF waveforms within at least one of an unlicensed or quasi-licensed spectrum band, the at least one of the unlicensed or quasi-licensed spectrum band selected from the group consisting of: (i) NR-U bands, (ii) CBRS bands, and (iii)C-Bands, using at least the at least one IC configured to support at least one of 3GPP LTE or 3GPP 5G NR protocols; and
causing delivery of the generated RF waveforms within the at least one of the unlicensed or quasi-licensed spectrum band to the second data interface via at least one frequency shifting apparatus.

21. A computerized apparatus for use within a network infrastructure, the computerized apparatus comprising:
a first data interface and a second data interface configured for data transmission with respective first and second portions of the network infrastructure, the first portion of the network infrastructure comprising a fiber-optic distribution portion of the network infrastructure, at least a portion of the second portion of the network infrastructure comprising a coaxial cable portion of the network infrastructure;
an IEEE (Institute of Electrical and Electronics Engineers) Std. 802.11ax-compliant chipset in data communication with the first data interface, the IEEE 802.11ax-compliant chipset configured to: (i) receiving, via the first data interface and the fiber-optic distribution portion of the network infrastructure, first signals, and (ii) process the received first signals to generate 802.11ax-compliant waveforms within a first frequency band via at least two spatial diversity ports associated with the IEEE 802.11ax-compliant chipset; and
at least one frequency shifter configured to down-convert a frequency associated with the 802.11ax-compliant waveforms from the first frequency band to a frequency within a second frequency band, the second frequency band adapted for downstream transmission to the coaxial cable portion of the network infrastructure via the second data interface.

22. The computerized apparatus of claim 21, further comprising an integrated circuit (IC) in data communication with the first data interface, the IC configured to support at least one of 3GPP (Third Generation Partnership Project) Long Term Evolution (LTE) or 3GPP 5G NR (New Radio) protocols, wherein the IC is coupled to the second data interface via a signal path comprising at least a second frequency shifter and amplification logic.

23. The computerized apparatus of claim 22, wherein:
the IC is configured to generate RF waveforms within at least one of an unlicensed or quasi-licensed spectrum band, the at least one of the unlicensed or quasi-licensed spectrum band selected from the group consisting of: (i) NR-U bands, (ii) CBRS bands, and (iii)C-Bands; and
the second data interface is configured to cause delivery of the generated RF waveforms within the at least one of the unlicensed or quasi-licensed spectrum band.

24. The computerized apparatus of claim 21, further comprising spatial diversity-enable antenna apparatus operatively coupled to at least the IEEE 802.11ax-compliant chipset, the IEEE 802.11ax-compliant chipset and the spatial diversity-enable antenna apparatus configured to enable transmission and reception of RF waveforms compliant with IEEE Std. 802.11ax.

25. The computerized apparatus of claim 21, wherein:
the processing the first signals to generate the 802.11ax-compliant waveforms within the first frequency band via the at least two spatial diversity ports associated with the IEEE 802.11ax-compliant chipset comprises processing the received first signals to generate 802.11ax-compliant waveforms within a first sub-band of the first frequency band; and
the computerized apparatus further comprises a second IEEEE 802.11ax-compliant chipset in data communication with the first data interface, the second IEEEE 802.11ax-compliant chipset configured to generate 802.11ax-compliant waveforms within a second sub-band of the first frequency band via at least two second spatial diversity ports; and
the first sub-band and the second sub-band are not overlapping with one another in frequency.

* * * * *